July 17, 1951 J. B. McDADE Re. 23,392

LOADING MACHINE

Original Filed Aug. 8, 1945 12 Sheets-Sheet 1

July 17, 1951 J. B. McDADE Re. 23,392

LOADING MACHINE

Original Filed Aug. 8, 1945 12 Sheets-Sheet 2

Inventor
John B. McDade
by Geo. Stewart Jackson and Co.
Attorneys.

July 17, 1951 J. B. McDADE Re. 23,392

LOADING MACHINE

Original Filed Aug. 8, 1945 12 Sheets-Sheet 3

Inventor:
John B. McDade.
by Wm. Strauch, Jr. and Son
Attorneys.

July 17, 1951 J. B. McDADE Re. 23,392

LOADING MACHINE

Original Filed Aug. 8, 1945 12 Sheets-Sheet 4

Inventor:
John B. McDade
by W. Stull Jackson and Son
Attorneys.

July 17, 1951 J. B. McDADE Re. 23,392
LOADING MACHINE
Original Filed Aug. 8, 1945 12 Sheets-Sheet 5
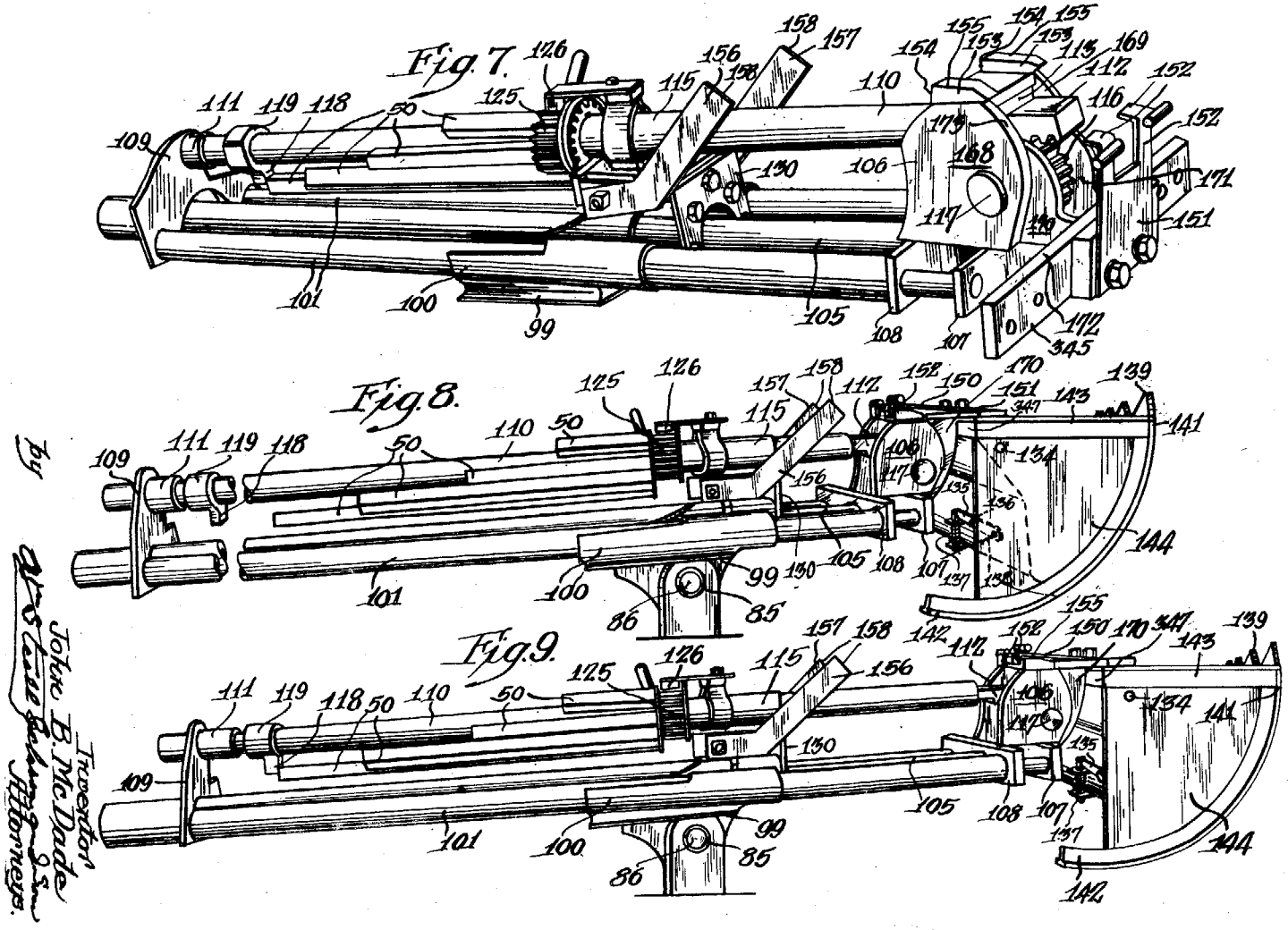
Inventor
John B. McDade
by
Attorneys.

July 17, 1951 J. B. McDADE Re. 23,392

LOADING MACHINE

Original Filed Aug. 8, 1945 12 Sheets-Sheet 6

Inventor
John B. McDade.
by W. Stuart Jackson and Son
Attorneys.

LOADING MACHINE
Original Filed Aug. 8, 1945 12 Sheets-Sheet 7
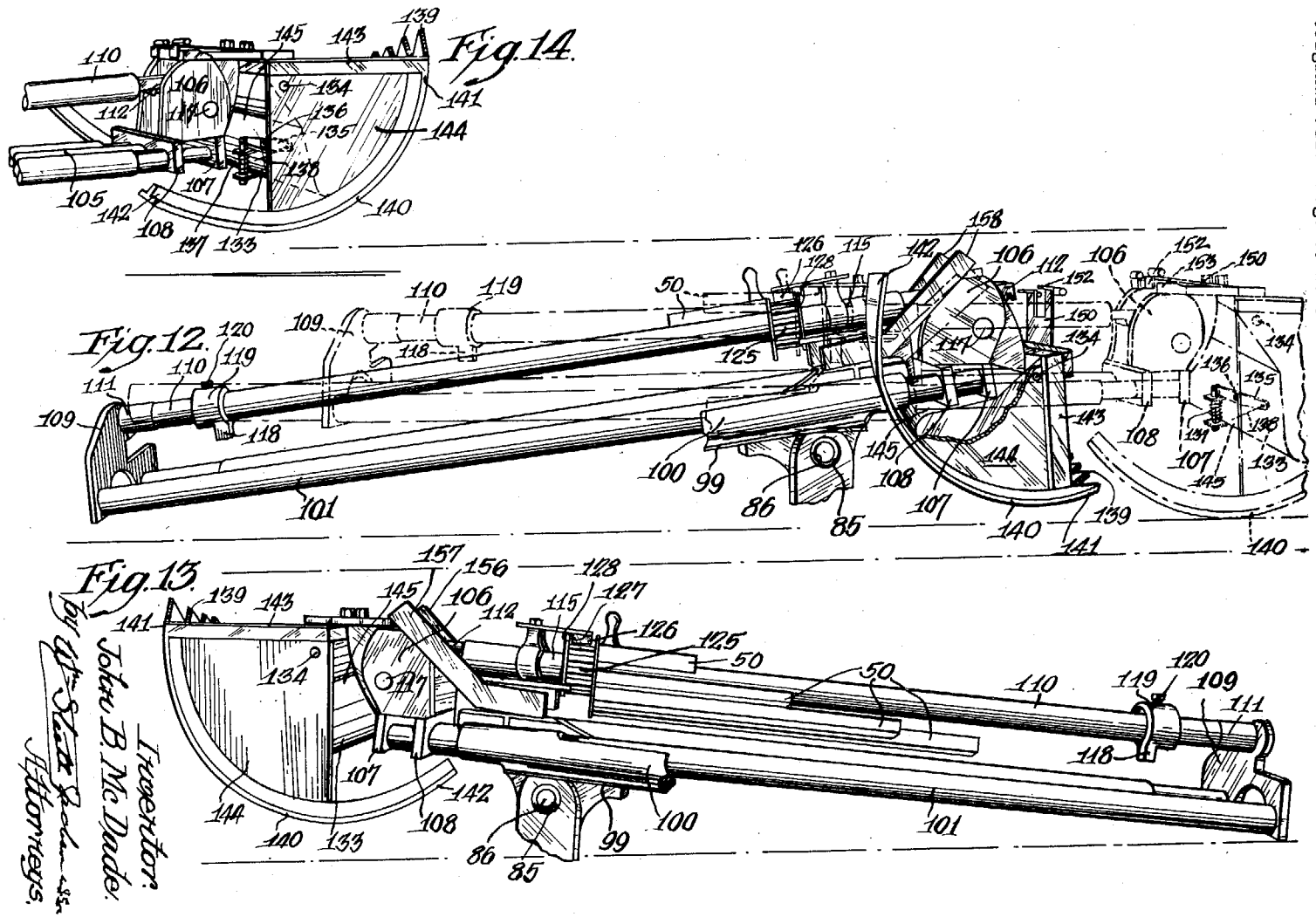

July 17, 1951 J. B. McDADE Re. 23,392
LOADING MACHINE
Original Filed Aug. 8, 1945 12 Sheets-Sheet 8
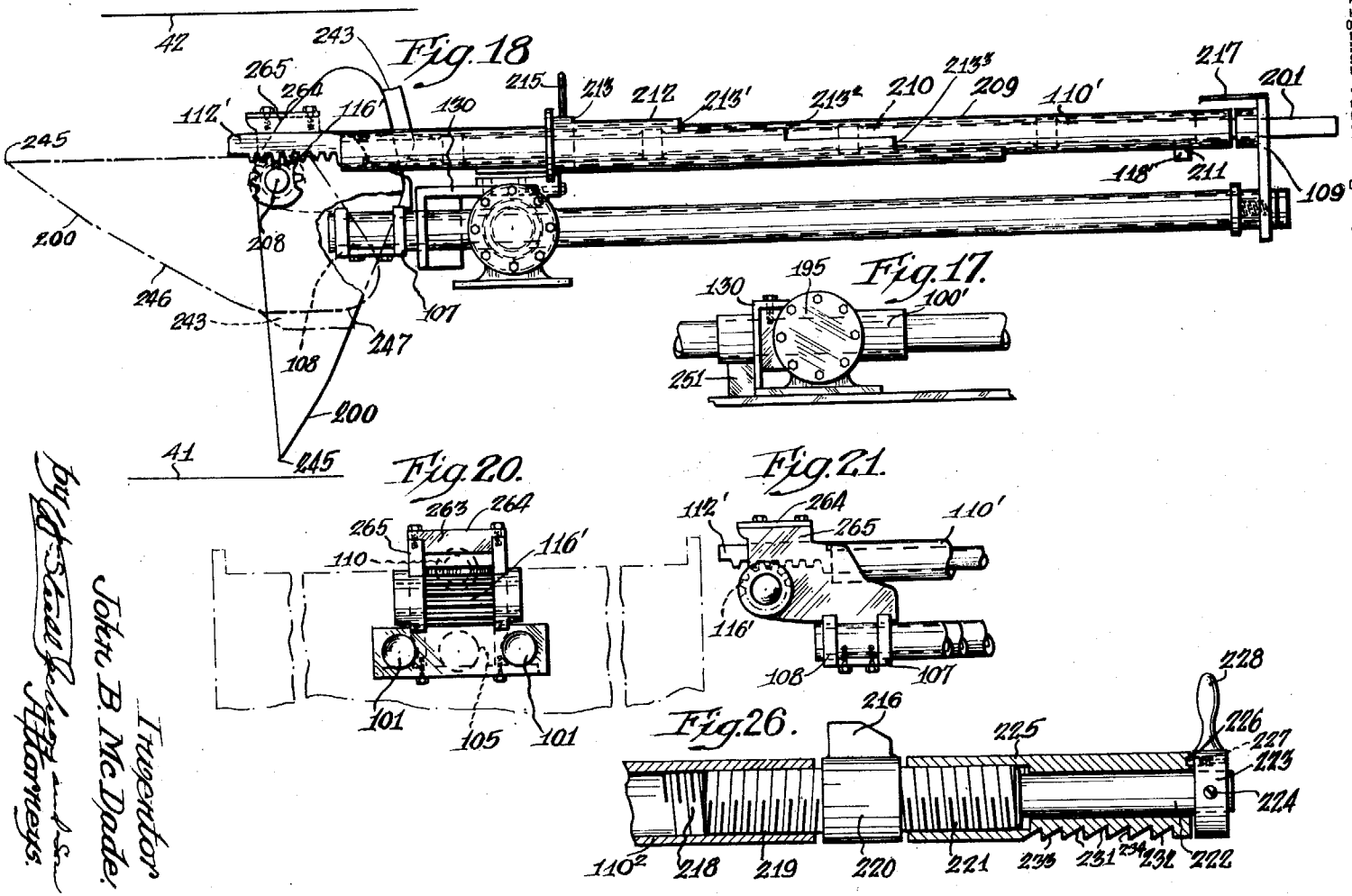
Inventor
John B. McDade.
by [illegible] Attorneys.

July 17, 1951 J. B. McDADE Re. 23,392
LOADING MACHINE
Original Filed Aug. 8, 1945 12 Sheets-Sheet 9
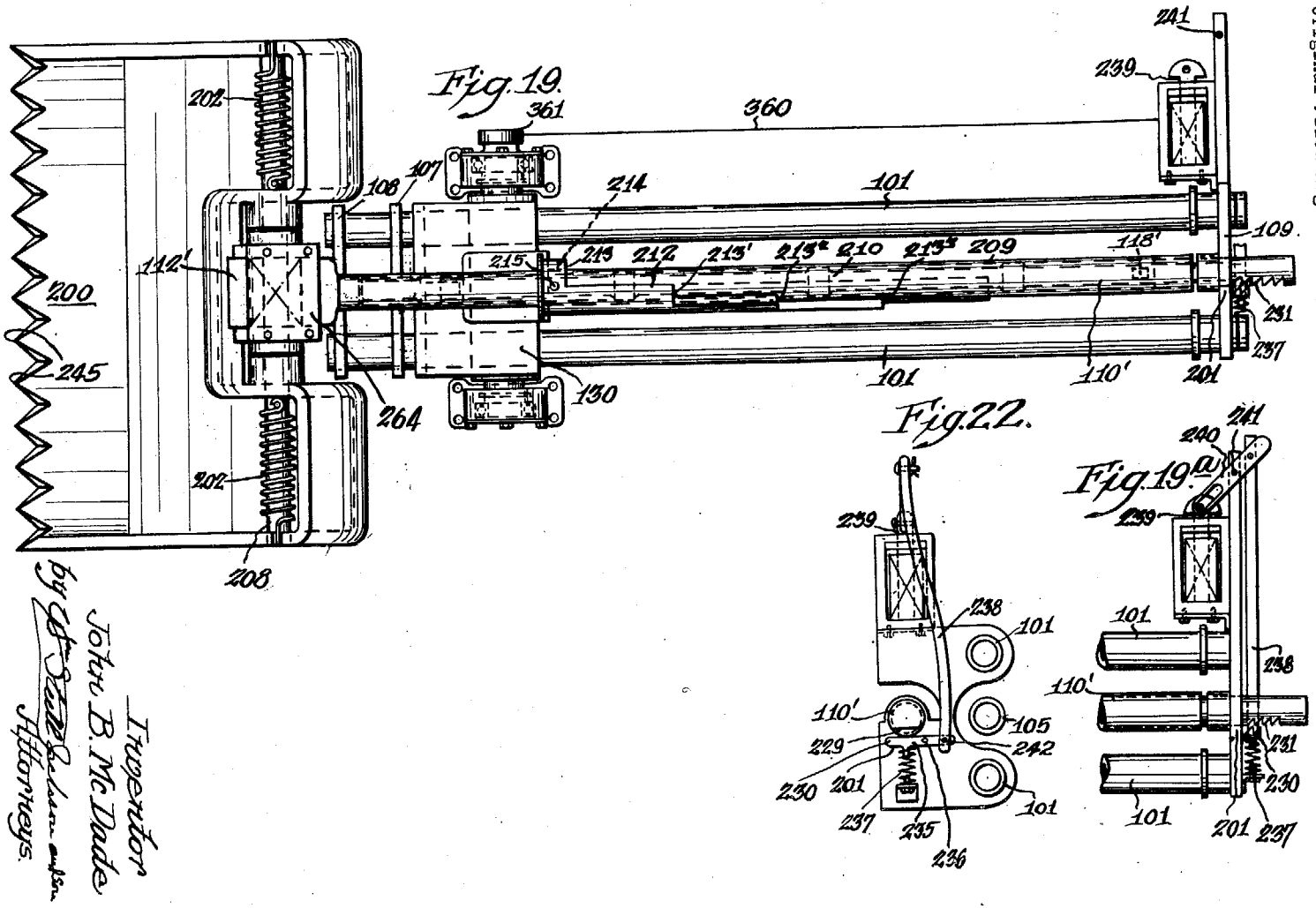
Inventor
John B. McDade
by [signature]
Attorneys.

July 17, 1951 J. B. McDADE Re. 23,392
LOADING MACHINE
Original Filed Aug. 8, 1945 12 Sheets-Sheet 10
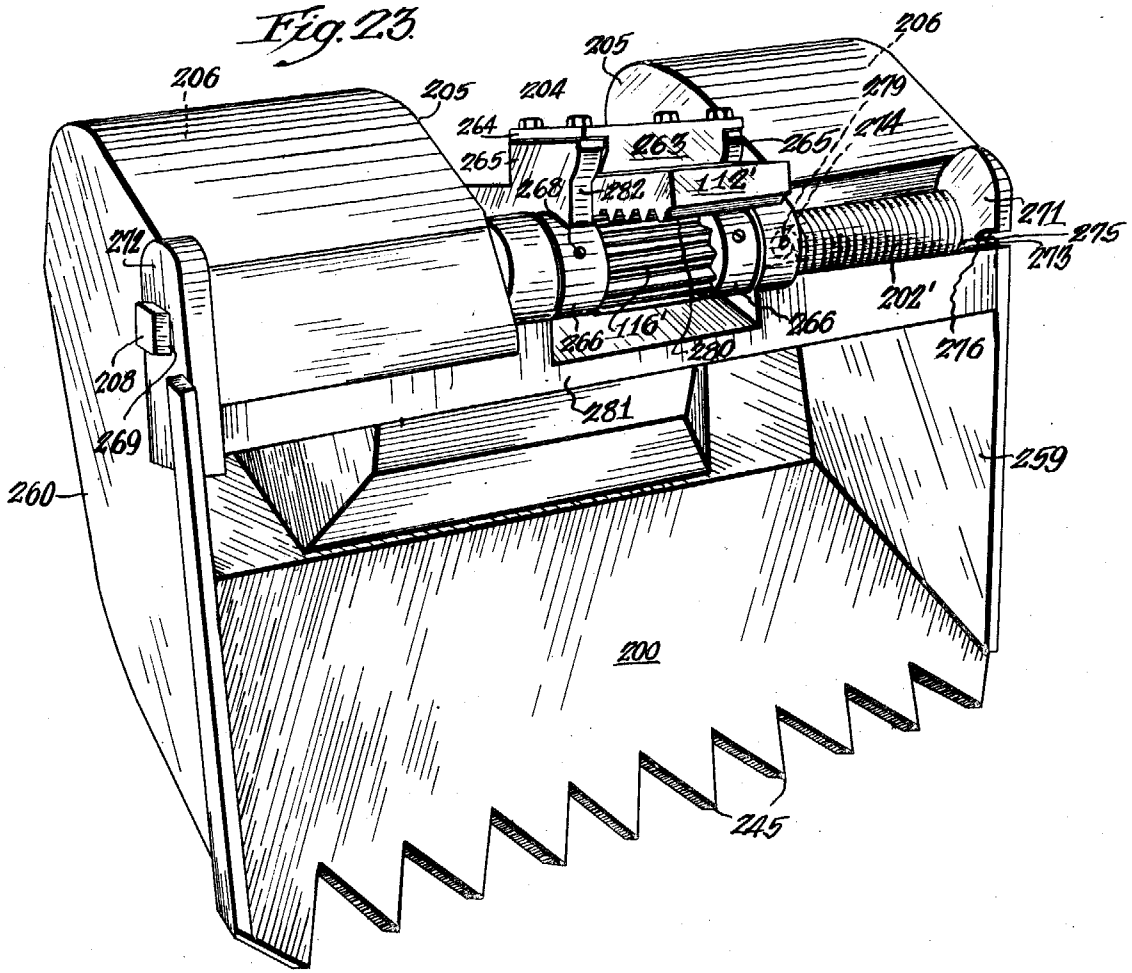
Inventor:
John B. McDade
by Wm. Standish Parker and Son
Attorneys.

LOADING MACHINE

Original Filed Aug. 8, 1945 12 Sheets-Sheet 11

Inventor
John B. McDade
by [illegible]
Attorneys.

Inventor
John B. McDade
by [illegible] and Son
Attorneys

Reissued July 17, 1951

Re. 23,392

UNITED STATES PATENT OFFICE 23,392

LOADING MACHINE

John B. McDade, Scranton, Pa.

Original No. 2,441,581, dated May 18, 1948, Serial No. 609,551, August 8, 1945. Application for reissue May 17, 1949, Serial No. 93,801

50 Claims. (Cl. 214—137)

My invention relates to a loader for coal or other material.

The main purpose of my invention is to make available the coal of a narrow vein.

A further purpose is to load a shovel by engagement of a gear connected to it with a motionless rack and to stop or release the rack by a preset automatic lock.

A further purpose is to provide a loading head which can be engaged with the cut pile of coal by direct thrust from the same source of energy and in which continued thrust from the same source of energy carries the shovel forwardly through the pile of coal and upwardly to fill and lock the shovel in upward filled position, ready for withdrawal.

A further purpose is to project a scoop or shovel from a position outside a narrow vein of coal into a pile of coal to be loaded and at the same stroke, by the equivalent of a hammer blow, to push the scoop through the pile and turn it to an upright, filled position.

A further purpose is to project a runner-supported scoop or shovel beneath the coal to be loaded, to load it and to withdraw it, in straight lines, while shifting the support from runners of one height to runners of a different height and turning the scoop or shovel upwardly to fill it, and to counterbalance the weight by the increasing weight of the rear of the operating mechanism until the latter overbalances the shovel and its load and the shovel can be swung about an outside axis.

A further purpose is to drive a shovel and cooperating head forward to any predetermined position, to stop the head in this position where it can engage the pile of coal to best advantage, to continue to drive the shovel forwardly and by cooperation with the head upwardly to fill the shovel and to withdraw the filled shovel for discharge and for a succeeding filling operation, all by direct plunger movement.

A further purpose is to drive a shovel or scoop forward into the coal by an hydraulic ram generally limited in its forward movement by the adjustable means, to gear the shovel to a rack travelling with the shovel to an adjustable initial limit, and, as part of the same driving movement, to turn the shovel upwardly to complete the filling of the shovel after the rack has ceased to move forward.

A further purpose is to project a shovel or scoop forwardly upon runners having a position effective as a radius beneath an hydraulic plunger, to tilt the shovel in and, as part of the same projection, through the coal being loaded to a vertical shovel position at which the distance above the runners is less than that during projection, to retract the shovel on the new position on the runners, to turn the shovel, horizontally free from pressure upon the runners and to discharge the shovel in the new turned position.

The means presented for sustaining the end of the thrustor permits the same operation without the use of runners.

A further purpose is to project the shovel to its loading position while resting it upon the floor on runners, to turn and fill the shovel while shifting its weight to runners of a shorter radius, to retract the loaded shovel part way while resting upon the lower runners and to shift the center of gravity of the boom, shovel and content so that the shovel is lifted from the floor for the final part of the retraction.

A further purpose is to provide an hydraulically driven shovel with stop mechanism carrying a turning rack, with adjustable means for determining the stopping points at which the rack may be made effective and a segment gear carried by the shovel engaging with the rack to turn the shovel up through the pile of material loaded, if and when the rack is stopped in its forward movement.

Further purposes will appear in the specifications and in the claims.

I have preferred to illustrate my invention by a few only of the forms in which it may appear, selecting forms which are practical and effective and which at the same time well illustrate the invention.

Figure 2:
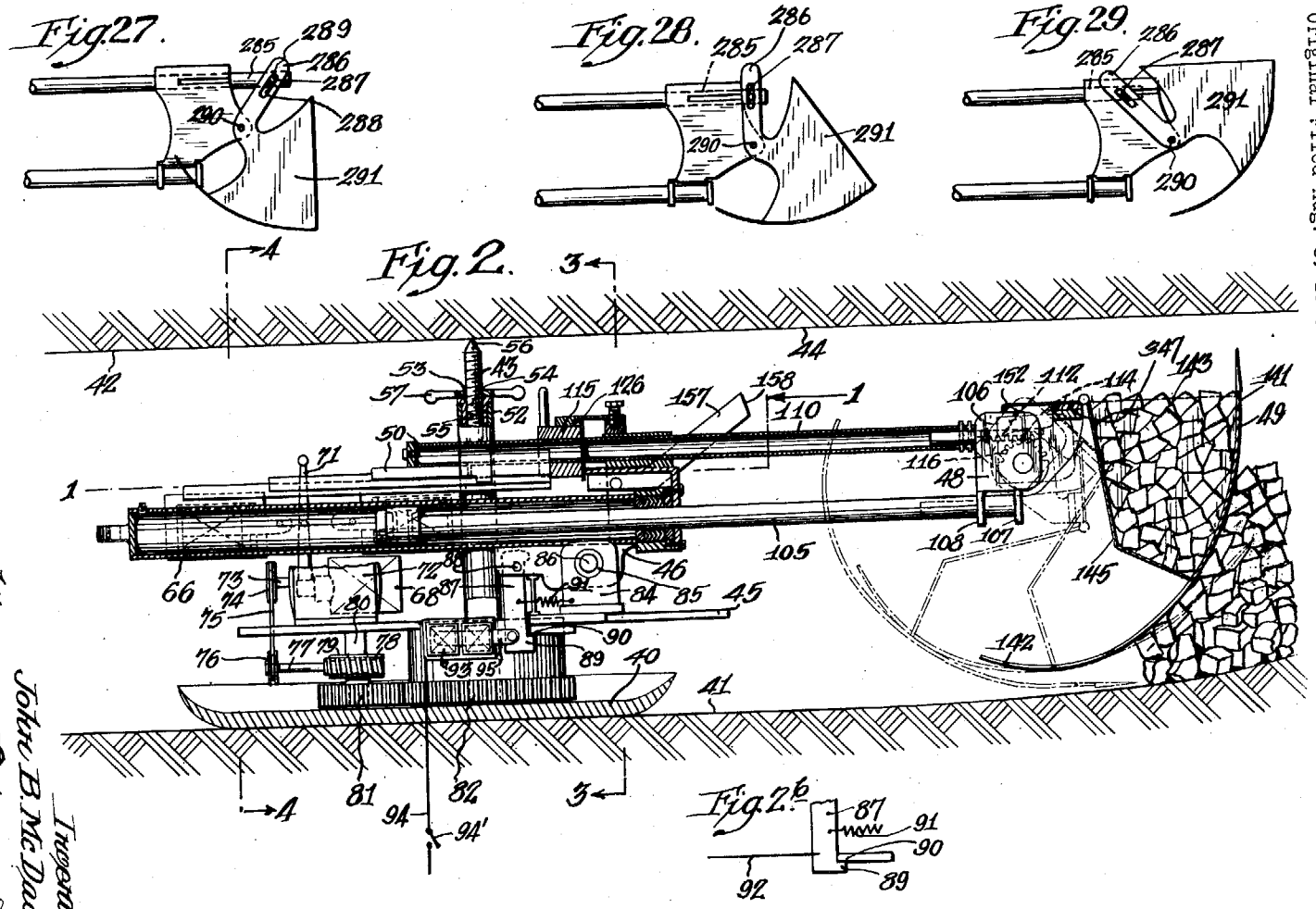
Figure 2 is a side elevation, largely in longitudinal section upon line 2—2 of Figure 1.

Figure $2^a$ is a fragmentary side elevation of a portion of Figure 2 but illustrating a modification.

Figure $2^b$ is a fragmentary side elevation of matter shown in Figure 2.

Figure 3:
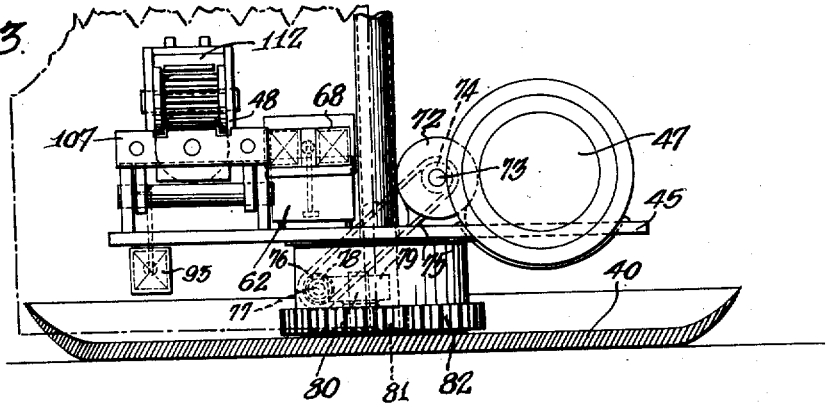

Figure 3 is a longitudinal section corresponding generally with line 3—3 of Figure 2. The jack is partly broken away.

Figure 4:
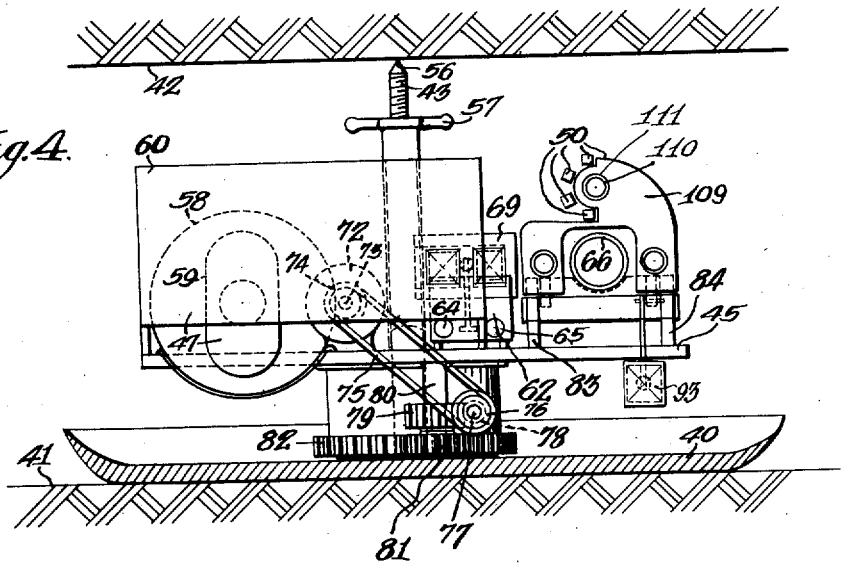

Figure 4 is a side elevation taken generally upon line 4—4 of Figure 2, and looking from the rear in the direction of the arrow toward the shovel.

Figure 5:
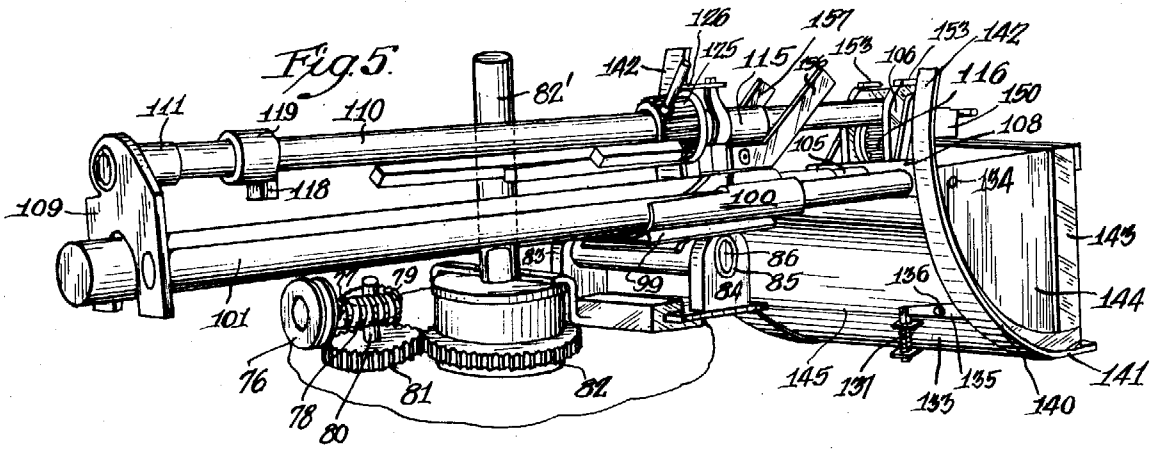

Figure 5 is a perspective view from the rear showing the main operating mechanism, but omitting such parts as the motors, pump and tank.

Figure 6:
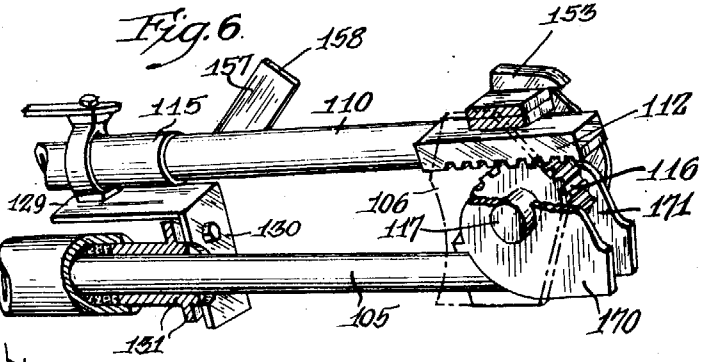

Figure 6 is a fragmentary perspective view, partly in section, looking from the front and toward the rear, showing some of the parts in Figure 5. The side supporting rods, shovel and other parts are omitted.

Figures 7, 8 and 9 are perspective views showing the gathering assembly in different positions, including in different figures the selector bars by which bodily travel of the shovel is stopped and operating mechanism by which plunger operation is converted into progressive shovel turning movement as it fills to the lifted position of Figure 9. Figure 7 omits the shovel.

Figures 2, 10:
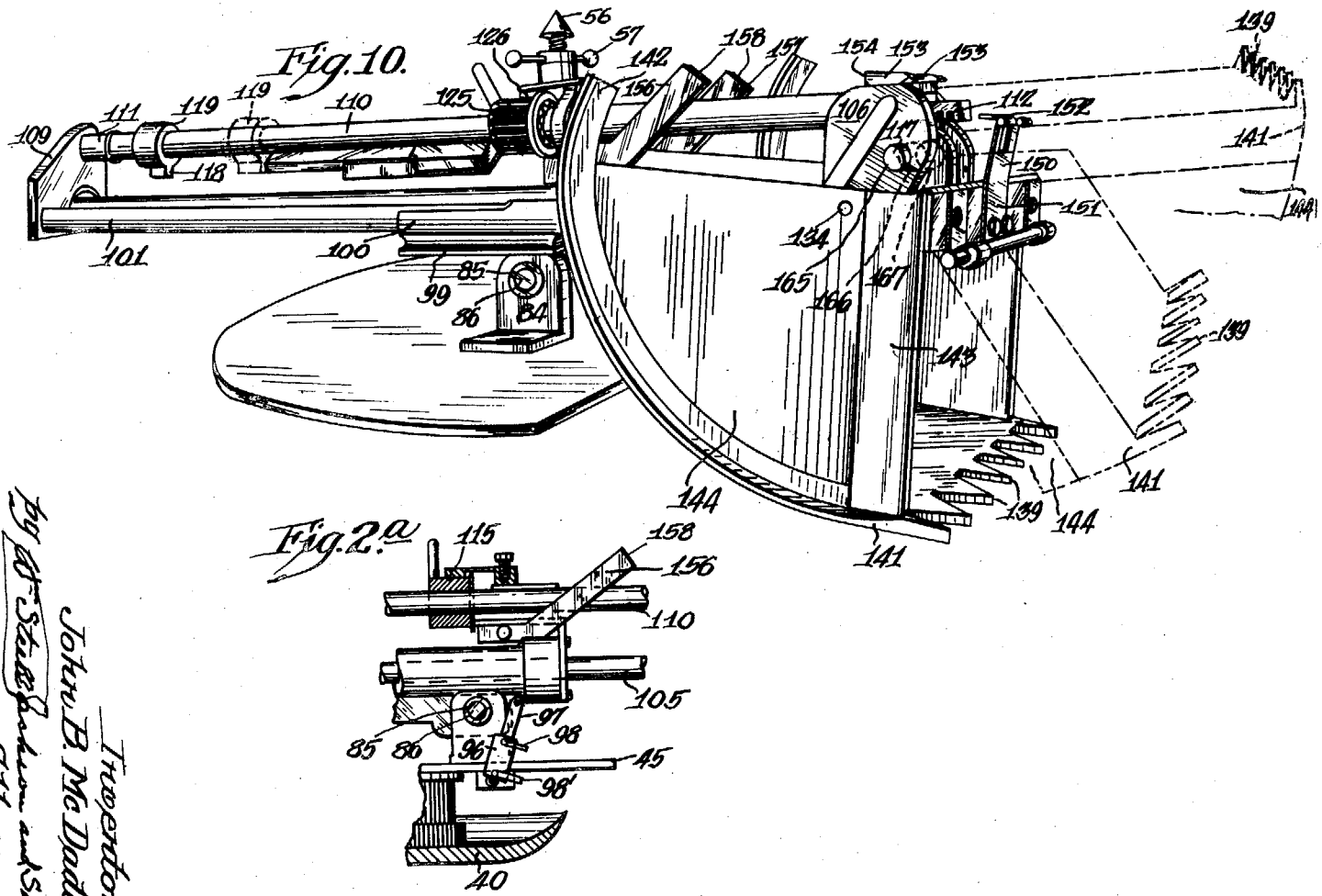

Figure 10 is an exaggerated perspective view illustrating the forward translation and rotary movement of the shovel in moving from empty to filled position.

Figure 11:
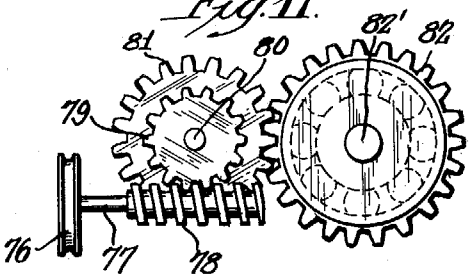

Figure 11 is a fragmentary top plan view, to enlarged scale, of gearing of the character of that seen in Figure 5.

Figure 12 is a fragmentary side elevation, omitting some of the selector mechanism, of the structure seen in Figures 7 to 10, showing in full and in dotted lines, respectively, the opposite tilting positions of the loader tilting about its horizontal axis.

Figure 13 is a perspective of a loader in rear position with the shovel lifted and turned and the parts tilted downwardly at the back.

Figure 14 is a fragmentary perspective showing the rear of the shovel in raised position.

Figure 15:
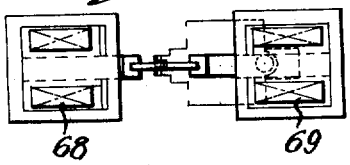
Figure 16:
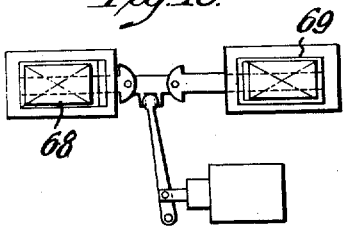

Figures 15 and 16 are a top plan view and a side elevation respectively, to a reduced scale and in large measure diagrammatic, showing solenoid actuation on an hydraulic control, operating the plunger in reverse directions.

Figure 17 is a fragmentary side elevation of a modified form of bearing for the gathering assembly.

Figure 18 is a side elevation of a modified form of shovel and its modified operating mechanism.

Figure 19 is a top plan view of the mechanism seen in Figure 18.

Figure 19a is a top plan view similar to Figure 19 but showing further detailed mechanism on the rear plate.

Figure 20 is a front view of a shovel-carrying front crosshead of modified form with shovel in dot and dash lines.

Figure 21 is a fragmentary side elevation showing the same crosshead as Figure 20.

Figure 22 is an end elevation of the right hand end of Figure 19, the mechanism in the distance being omitted and the lock being shown as engaging a ratchet.

Figure 24:
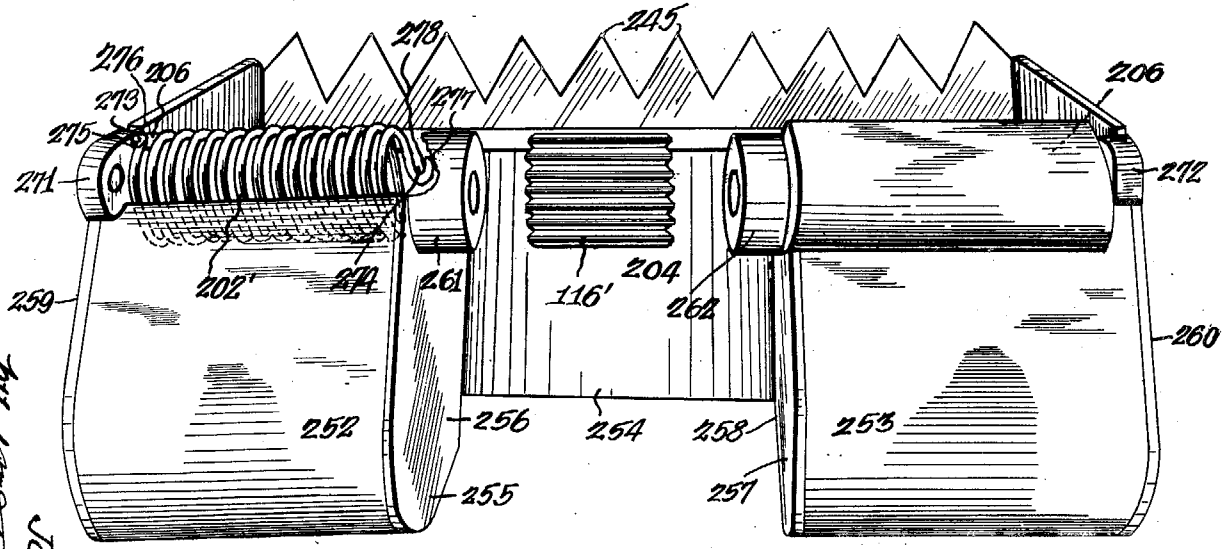
Figure 25:
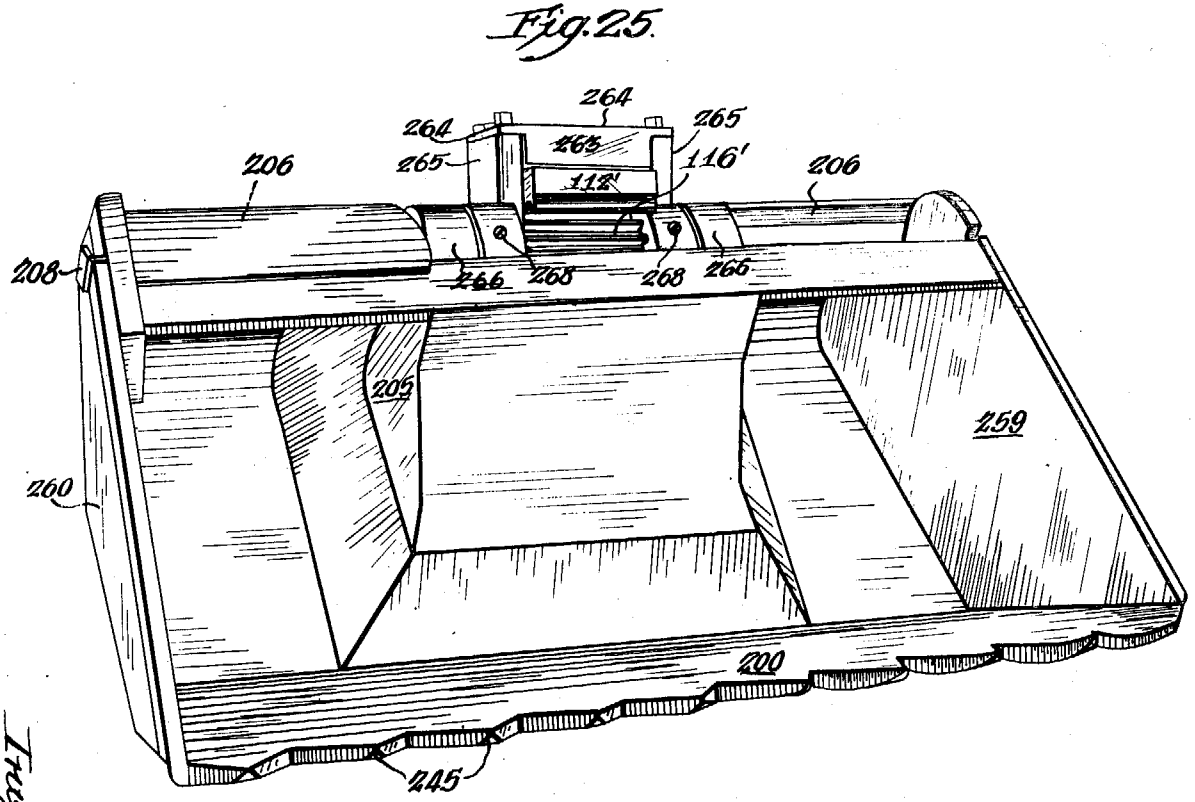

Figures 23, 24 and 25 are perspective views showing structure of modified shovels.

Figure 26 is a fragmentary longitudinal section of a check rod showing special latching notches.

Figures 27, 28 and 29 are fragmentary side elevations showing a modified form of lever mechanism serving the purpose of the rack and segment gear.

In the drawings similar numerals indicate like parts.

The coal is blasted at the face of the seam and falls on the floor of the chamber from which it is gathered and removed. The present invention is dealing with very narrow seams with the result that the gathering mechanism must be kept extremely low. Hand shovelling conditions are simulated and the filling of the shovel is accomplished by a progressive forward movement which at the end of its stroke turns the shovel up through the pile.

Any dimensions given in this discussion must be considered as examples only since conditions will vary greatly in different locations depending upon many factors, among which are the thickness of the vein, the character of the overburden, the availability of haulageways in which mine cars can be operated, etc., and the dimensions will be affected by such differences.

Figure 1:
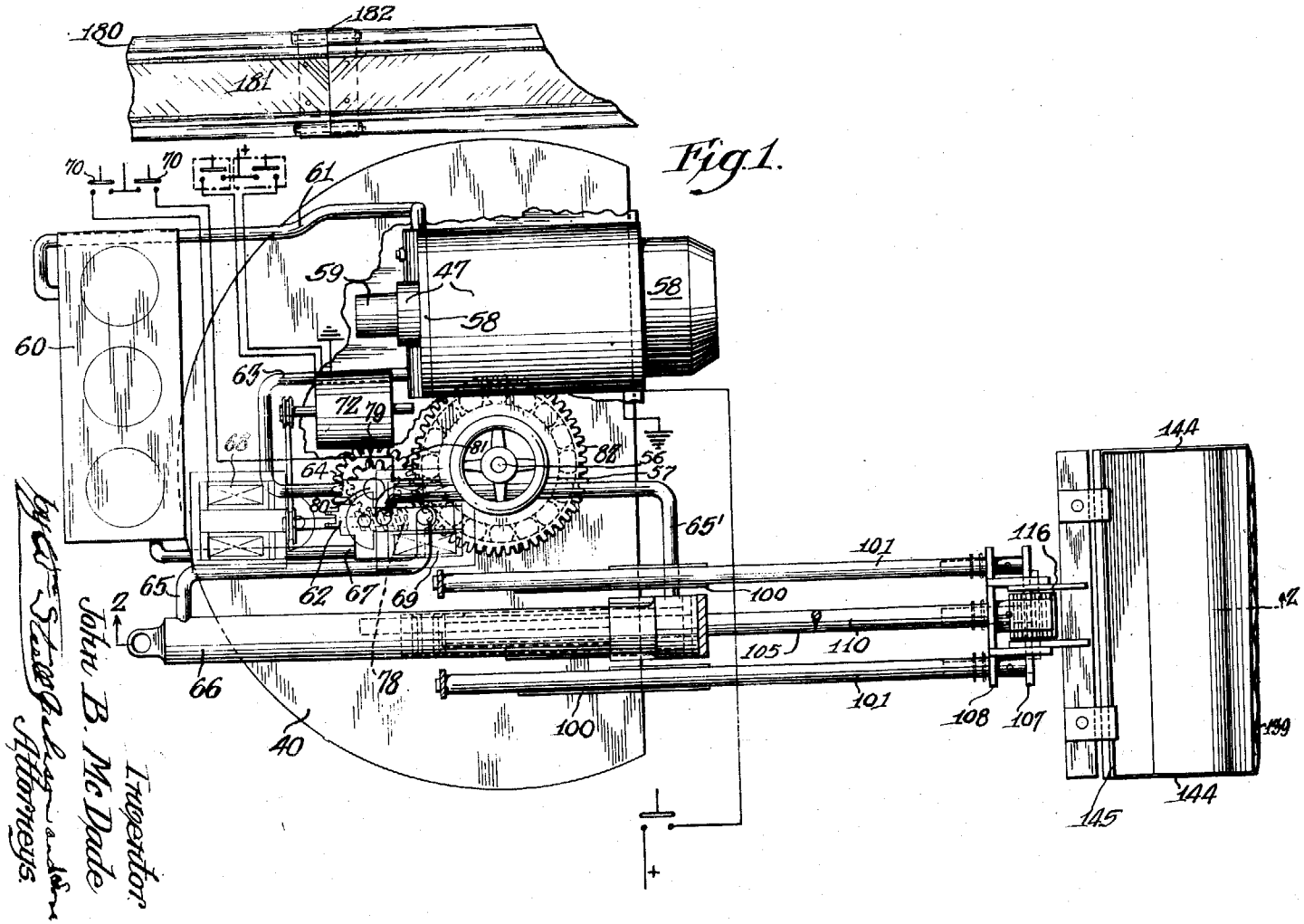
Figure 1 is a top plan view of a hand controlled form, sectioned on some such line as 1—1 of Figure 2 to show the plunger and cylinder.

In Figure 1 of the drawing, one of my loaders is shown in a chamber, with a conveyor along the side of the loader and of a conveyor type well known in the mining art, namely, a Shaker conveyor, made up of pans fastened to each other of a type in which the shaking of the conveyor provides the longitudinal feed of the conveyor along the conveyor length. Pans are added to extend the length.

*The loader*

The loader comprises generally a base 40 adapted to rest on the floor 41 of a chamber 42, a jack 43 suitable for engaging the roof 44 of the chamber, a turntable 45 and a tilting assembly 46, carrying a gathering arm in the form of a thrustor or projector unit. The machine includes a power plant 47 for the operating parts, a front crosshead shovel assembly 48, a shovel 49 and stop mechanism 50.

*The anchorage*

When the loader has been placed in the position from which it is intended to operate, it must be anchored very firmly in order that its operation may be reliable and forceful and that the shafts about which the loader swings horizontally and tilts vertically may be properly supported.

Because the floor of the chamber in which the loader is to operate is necessarily uneven, it is desirable that the base 40 cover a large area. It is anchored in position by a jack 43 welded to the base and whose upper end terminates in a socket 52 within which rests a nut 53. The interior nut thread 54 engages the thread 55 of the hardened jack point 56. The nut is rotated by a hand wheel 57 and the thread may be kept from rotating in any way of the many known.

*The horizontal swinging movement*

The turntable 45 supports the entire tilting assembly and is mounted to rotate about the jack, for convenience considered as in horizontal planes. The turntable, as seen in Figure 1, supports the gathering (vertically tilting) assembly on one side of the jack position and a power plant for the gathering assembly on the opposite side thereof, so placed for convenience merely in balancing. The operating mechanism for the gathering assembly comprises a motor 58, a pump 59, tank 60 for the hydraulic fluid—considered here as oil, oil intake 61 for the pump, fluid control 62, connection 63 from the pump to the control inlet 64 and outlet 65 from the control to the hydraulic cylinder 66 and return 67 from the control to the oil tank.

The hydraulic control mechanism is an operating valve merely for distributing the fluid from the pump to and from the hydraulic cylinder. It and its solenoid control are well known in the art. The valve can be operated alternatively by the solenoids 68, 69, through electrical switches 70 located at any suitable point or can be operated locally by any suitable fluid connections from a hand lever 71.

In order to accommodate tilting of the gathering assembly, the fluid connections are made flexible. The turntable is not merely free to turn but is turned by an electric motor 72 and suitable connections. The motor may be supported above or below the turntable as preferred but in the illustration is above the table. Upon the motor shaft 73 is located a pulley 74 connected by belt 75 with a pulley 76 below the turntable. The pulley 76 rotates shaft 77 carrying worm 78 engaging with worm gear 79 upon shaft 80 supported from the turntable. The shaft 80 carries a gear 81 which meshes with a fixed circular rack 82, so that the turntable is rotated with respect to its support. Mechanism of the character shown in Figures 1 and 2 is shown in a separate view in Figure 11. There are so many ways of rotating the turntable that this is suggested merely as one operative way of performing the function.

*Tilting of the gathering assembly*

Upon the turntable at any point suitable to balance the power plant are located ears 83, 84 which support sleeve 85, turning on a pin 86 about which pin the gathering assembly is capable of tilting. This tilting action is preferably left wholly to gravity. The movement of the working parts forward and back throws the center of gravity to the front or the rear, as the case may be, of a vertical line through the pin 86 and causes the tilting. Except as it may be desirable to control by a lock, the tilting about the pin will be dependent wholly upon shifting of the center of gravity due to extension or retraction of the plunger and to the shovel projected and retracted by it.

In all of the figures, the tilting assembly is free to tilt in counterclockwise direction, as viewed in Figure 2, at all times when the moment of the weight and distance to the left of the pivot pin is greater than the moment of the weight and distance to the right of this pin in the figure. However, it is desirable for certain purposes to prevent the tilting assembly from turning in clockwise direction in Figure 2 as soon as the moment of weight and distance at the right exceeds the moment of weight and distance at the left; and for this purpose a lock is shown.

In Figure 2 a lock 87 in the form of a pendulum arm is supported from a pivot 88 on the gathering assembly 46 rearwardly of pivot pin 86 and is so balanced that the arm will tend to swing in counterclockwise direction, so that the latch 89 will rest under keeper 90. It is held there by spring 91, alternative to gravity operation and tends to remain under the keeper, preventing the assembly from tilting in clockwise direction. This swinging pendulum latch can be released by hand as by cord 92 (Figure 2[b]) or can be controlled by solenoid 93 and electric circuit 94, controlled by switch 94' (Figure 2). The solenoid bar 95 is light enough to be thrown freely to pendulum locking position when the current is not turned on at the solenoid.

Alternative to the gravity tilting of the gathering assembly by shift of center of gravity from front to back or back to front with respect to the tilting axis, the tilting may be accomplished by various other mechanical means such as the hydraulic jack shown in Fig. 2[a].

The cylinder 96 and the plunger 97 of the jack are suitably connected with the turntable 45 and the tilting assembly so that the jack can either push or pull, as may be desired. It is supplied with liquid, under pressure at either end, as at 98, 98' and the same connection through the valve will be used for exhaust at the other end.

*Driving and supporting mechanism for the gathering assembly*

The plate 99, which is secured to the sleeve 85 in any suitable way for tilting movement about pin 86 provides a support for the entire tilting assembly.

Rigidly secured on the longitudinal center line of plate 99 is the hydraulic plunger cylinder 66, and to each side thereof, bearings 100 are provided for supporting and guiding side rods 101, which slide freely through the bearings and which along with piston or plunger 105, are rigidly attached at their front ends to a front supporting crosshead 106, comprising spaced side plates 168, 169 secured to and extending vertically from the transverse front and back crosshead plates 107, 108, and at the rear of the rods to a rear plate 109.

Means of attachment of the side rods and of the front end of the plunger are shown and are necessary, but their character is wholly immaterial.

Conveniently above the side rods is located a check rod 110, which is supported against lateral movement in the rear plate but is free to slide through a bearing 11, supported by the rear plate.

Check rod 110 carries a check finger 118 (Figure 13) mounted upon a collar 119 movable along the length of the check rod and adapted to be set in any suitable position along the rod by set screw 120 (Figures 12 and 13).

The purpose of a check finger is to engage with stops 50 which project into its line of travel from the relatively fixed support, for the purpose of stopping movement of a check rod at any of a number of predetermined positions in order that a shovel may begin operation at a point selected as a stop. Where bulldozing is intended, the finger is set so that it will not engage a stop.

Upon the crosshead of the tilting assembly is mounted a supporting and stabilizing bearing 115 through which the check rod slides. Adjacent to this stabilizing bearing there is mounted a ratchet wheel 125 fixed against longitudinal movement along the check rod and supporting check bars which form stops to be engaged by the check finger. In the earlier form the ratchet wheel physically supports the check bars so that the wheel and the bars supported by it can be turned transversely to the lengths of the bars about the check rod and can be latched in any of the selected positions.

The latch 126 is spring mounted to engage within the ratchet recesses in the exterior of the wheel and the heel 127 of the latch engages with a collar 128 (Figure 13) on the wheel to hold the ratchet wheel from moving in one direction, longitudinal movements in the other direction being prevented by engagement of the end of the wheel with the angle plate 129 (Figure 6), whose flange 130 is bolted to the front of a stuffing box 131, used to seal against the operating plunger.

By turning the collar and check finger circumferentially about the check rod and fastening it in the position to which it has been turned, the check finger can be set so that its path of movement will cause it to engage with any stop selected, or to be free from engagement with any stop.

The forward end of the check rod 110 carries a rack 112 (Figure 7) which is normally unrestrained and free to move longitudinally with respect to the front crosshead. The rack is restrained against upward movement by bearing 113 and meshes with a segmental gear 116 which is rigid with the shovel, these means co-operating to translate and rotate the shovel as hereinafter explained.

*The shovel*

In the use of the word "shovel" it is intended to include a container capable of gathering from a pile whether the container might be more naturally referred to as a bucket or as a scoop, for example, or not, because the present invention is considered to be applicable generally to all such types of containers having openings into which the material is gathered as the shovel is pushed forwardly. It is the intention therefore to give the shovel a generic meaning.

Whatever the type of shovel, it is the intention to secure it rigidly to what is effectively a gear 116 and to mount the whole unit about an axis in a pin 117 or other support so that the gear will mesh with the rack 112 and shift the rack if the gear rotate without translation but to cause rotation of the gear and of the shovel if the gear travel lengthwise of the rack while meshing with it. The pin will therefore occupy different positions with translation along the length of the rack as indicated at the initial position 165 and two succeeding positions 166 and 167 which correspond with the dotted positions shown for the front of the shovel in Figure 10. Because the construction does not require that the entire circumference of the gear be used, it has been referred to somewhat as a "segment."

The two ends of the pin 117 are supported in plates 168 and 169 (Figure 7), and the connection of the shovel to the gear is made through plates 170 and 171 which are welded to an adjacent portion 345 of the shovel (Fig. 7).

Two forms of shovel are shown herein. The first form of the shovel has a latched rear gate which becomes the bottom when the shovel is turned upwardly in filling. This latched rear gate 133 is shown in Figures 5, 8, 9 and 14.

It is hinged at 134 and is fastened in any suitable way as by latch 135 pivoted at 136 and spring-pressed at 137. The latch can be released by hand by pulling cord 138 (Figure 12) or it can be released from a more distant point, as by a solenoid. The character of the latching and unlatching mechanism does not alter the effective character of the release when the latch has been thrown.

The shovel of Figures 5, 8, 9, 10, 12 and 13 is provided with gathering points 139 and runners 140 which are differently spaced at the front and back in their distances from the pin 117 by which and about which the shovel is supported.

The front ends 141 of the runners are spaced farther from the supporting pin 117 than the rear ends 142 (Figure 12) for a double purpose. First, so that in turning upwardly through the pile to be gathered, the shovel's supporting arm with the shovel may be allowed to settle slightly toward the floor of the chamber as it fills, in order that there may be not quite so much work required in lifting the material from the pile, and second, so that when the arm is retracted with the load to a point where the load is to be swung horizontally preparatory to discharge, shift of center of gravity of the combined arm and shovel about the tilting axis or forcible tilting of the arm about the axis will be more effective in spacing the shovel from the floor of the chamber reliably than would otherwise be the case and the arm carrying the shovel may therefore be shifted horizontally so as to bring it in line angularly with the position at which the shovel is to be emptied.

The front 143 of the shovel above the runners, the sides 144, and the rear 145 including the rear gate enclose a shovel content which is very easily retracted, turned and emptied.

In Figures 5, 7, 8, 9, 10 and 12, one form of latch is shown by which the shovel can be held in its raised position after it has been swung up through the pile of material being loaded. In this latch, a spring arm 150 is supported in any suitable way from the shovel, as by plate 151 in order to present latch fingers 152 in a position resiliently to engage the rear surfaces 154 of keepers 153.

The front and top surfaces 155 of the keepers spring the fingers upwardly during the upward swing of the shovel and the fingers snap to position back of the keepers.

With this particular form of latch, automatic mechanical release is provided in the form of horns 156 and 157, secured to either side of plate 129 and carrying at their outer ends cam faces 158 to be engaged by the fingers, when the shovel is retracted fully. When this latch is used it is the intention to stop retraction of the shovel a short distance from the rear of the shovel stroke, retracting most of the distance but not the full stroke. After the shovel has been swung into the proper angular position for emptying, extended to the position at which its content is to be discharged and emptied, the shovel is then fully retracted to release the latches and permit the shovel to fall downwardly from its loaded position to the position of Figures 10 and 12. The final retraction can take place at any time between the emptying of the shovel and the beginning of a new cycle. Releasing of the latches may be, therefore, effected during the time that the turntable is being swung horizontally so as to bring the gathering assembly into proper angular position to start another cycle.

It will be clear that the construction shown is a build-up from elemental materials and that the parts shown can be supplied by castings, forgings, etc., to unite in one piece initially parts which are indicated as made in several parts and welded or otherwise fastened together. This applies particularly to the build-up of the crossheads, to the supports for the gear and shovel, and to the way in which the selector bars, ratchet wheel and other parts are assembled.

*Operation*

The operation may be well understood by reference to Figs. 10 and 12. In these figures there are shown in solid lines the initial position of the parts before gathering begins and in dotted lines the positions after gathering.

The supporting mechanism for the tilting assembly and the jack and all of the power-plant structure have been omitted so that we are dealing with the bare assembly parts. The positions of the parts assume that the lock against forwardly and downwardly tilting has been released.

Fluid under pressure has been supplied to the plunger cylinder and the plunger or thrustor has started forward and has reached a point at which the torque due to weights of the front parts including the crosshead, the shovel, the side guide rods and the check rod which lie forward of the tilting axis have overbalanced the torque due to weights of the remainder of the parts of the plunger, side guide rods and check rod as well as the cylinder behind the tilting axis so that in the absence of locking against tilting, automatic tilting forwardly and downwardly has taken place. Since the shovel is emptied and in position to begin gathering, the shovel has settled down upon the longer radius of its runners with its teeth in position to engage the pile to be gathered.

Remembering that the side supporting and guiding rods and the plunger (thrustor) are connected to the front crosshead, that the gear rigid with the shovel is held against rotation by the friction against the lower part of the shovel and that the rigidity of the position of the gear likewise fixes the position of the rack with respect to the other rods, it is clear that the check rod, as well as the other rods named, will travel forward with the shovel and at the same speed as the crosshead. This condition of relative speed and maintenance of initial positions of some of the rods with respect to the others continues until the check rod finger meets and is stopped by that selector bar whose stopped position corresponds with the location of the pile to be handled.

The selector bars are for the most part not shown in Figure 12, but a particular selector will have been chosen and will have been turned into the path of movement of the check rod finger (applying to the first form where the selector bars swing about the check rod).

When the check rod finger engages a selector, the check rod is stopped and correspondingly the rack upon the end of the chuck rod is stopped; but the plunger (thrustor) continues to move and carry with it the front crosshead along with the side guiding and supporting rods which are rigidly connected with it.

As suggested, that selector will have been chosen which stops the check rod and rack just when the shovel is about to attack the pile of material to be gathered and loaded; with the result that the gear in the front crosshead begins to travel along the rack, as indicated by 165, 166 and 167 of Fig. 10, and the teeth of the shovel rigidly attached to the gear begin to revolve forwardly and upwardly at the very beginning of the approach of the contact of the shovel with the pile.

The upward turning movement of the shovel is continuous with its forward thrust and is so rapid that perhaps the shovel should be considered as whirled. The effect is as of a hammer blow. When it has been whirled to filled position, as elsewhere more fully discussed, it is necessary that it be held in an upturned position during the withdrawal of the shovel so that the attempt to withdraw does not reverse the whirling of the shovel and spill the contents. For this reason a latch is required to hold the shovel in its upturned position; and this latch also must be capable of convenient release after it has been emptied in order that the empty shovel may assume its proper horizontal position for the beginning of a new cycle.

The side guiding and supporting rods 101 travel not only with the plunger and with the front crosshead, but for the most of the stroke of the plunger travel also with the check rod, the four forming a parallelogram. When the check rod is stopped, the guiding and supporting side rods, the plunger, the front crosshead and the rear plate 109 continue their movement and may be considered as telescoping the check rod.

The side rods and the plunger as well as the front crosshead, and to a less extent the rear crosshead, greatly increase the inertia of the moving parts which continue to move after the check rod has stopped. They advance the rack gear along the rack, and as a continuous stroke, not only move the shovel forwardly with the open bucket facing to the front, but turn the bucket upwardly to fill it and to latch the bucket in its upper position with the bucket opening directed upwardly, getting full advantage from the effective hammer blow to which these parts so much contribute.

It will be noted that the identical action of the shovel takes place beginning when the check rod is stopped, no matter at what position the stoppage of the check rod takes place.

Various ways are effective to stop the forward movement of the segment gear along the length of the rack, of which two only are shown.

In Figure 7, a point 172 on the shovel adaptor is arranged to strike against a point 173, upon the supporting plates by which the pivot pin is mounted so that the revolution of the shovel will be stopped at any angle provided, represented by the engagement of these two positions.

It will thus be apparent that the shovel is unloaded at the start and has dropped in clockwise direction from its loaded position to the initially unloaded position seen in Figure 12.

During the loading operation the shovel whirls upwardly causing the support of the shovel to be shifted from the front 141 of the runners to the rear 142 of the runners, resulting in a slight clockwise tilting of the assembly.

Because of the shorter radii of the rear parts of the runners as compared with the radii of the front parts of the runners, this reduction in the height of the shovel considered as an entirety reduces the amount of energy required to drive the shovel up through the pile of material.

After the shovel has been latched in its raised, filled position, as in Figure 2, the tilting assembly can be retracted hydraulically by the plunger without danger of the shovel discharging prematurely through its front opening by gravity reversals of the position of the shovel.

During the retraction and until the assembly tilts by gravity in counter-clockwise direction, as viewed in Figure 2, the shovel rides upon the floor of the chamber on the rear portion of its runners so that both the shorter radii at the rear portions and the counter-clockwise tilting of the assembly due to gravity as it approaches the tilting axis contribute to lifting of the shovel from the floor. As a result when the shovel has lifted, the turntable can be rotated to swing the shovel to a new direction of movement at which the shovel can again be extended for emptying purpose. It will be noted that the retraction of the shovel before this re-extension for emptying will not be far enough for the latches upon the shovel to be released by the cam surfaces upon the horns; so that the shovel will be maintained in lifted position and full until it can be extended in the new direction for emptying through the rear gate.

The catch of the rear gate may be opened electrically or by pulling the cord (Fig. 12) or in any suitable manner.

It will be remembered that from the time that the assembly has been retracted with the shovel full, the tilting mechanism is locked against extended gravity tilting forwardly and downwardly so that the extension of the assembly in the new direction for emptying purposes does not cause tilting even though the center of gravity passes the axis. The shovel may be emptied into a pan of a conveyor or in any suitable place.

After the shovel has been emptied it is swung to a position for the beginning of a new cycle and is also tilted in clockwise direction (as viewed in Figure 2), the former being accompanied by the turntable movement and the latter by releasing the latch holding the shovel up. This latch can be released by pulling the cord, for example, or by electrical means, and the two operations can be performed in either order or concurrently. Before the second cycle is started or earlier in the movement of the thrustor before the second cycle, the thrustor must be released so that it can tilt forwardly.

The conveyor 180, shown in Figure 1, is intended to be generic in that it may be any conveyor which can operate within the chamber and upon which the content of the shovel can be emptied. The structure of conveyor shown corresponds with a well known type of shaker conveyor, in which shaker conveyor pans 181 are fastened together at 182 in sections as the chamber is extended and in which the longitudinal shaking of the conveyor feeds the material mined toward the master conveyor or the car by which this material is ultimately carried out by the haulageways.

Some of the fundamental advantages of the present invention are that it gathers the coal into a suitable shovel or scoop by direct thrust, concurrently turns the shovel up through the pile of coal while the shovel is advancing so as to fill the shovel fully and holds the coal securely within the shovel. Because the thrust is direct, the mechanism can be kept extremely low so as to operate to its best advantage across the breast within a chamber formed by removal of the coal from a thin seam.

This greatly cheapens the loading operation. In contrast to this, at present the work must be done by hand, or rock must be removed in addition to the coal for the purpose only of giving room for a high and cumbersome machine.

My machine in practice telescopes to a fraction of its total operating length, adjusts to start its gathering operation in any position throughout its range and finishes its gathering movement by a hammer blow which lifts the shovel up through the pile to complete the filling of the shovel.

In Figure 17, a slightly different construction of the bearing for the tilting assembly is shown at 195, as compared with that in Figure 5, using a standard form of ball bearing to ensure as low friction as possible in the tilting support. In the same figure a slightly different angle plate 130 is used and the bearing 100' differs slightly from the bearing shown in other figures.

A different form of shovel is shown in Figures 18, 19, 23, 24 and 25, which for many uses represents a distinct advantage over the shovel of the previous figures. This second form is described and claimed in a copending divisional application for Loading machine, filed by me on November 14, 1945, Serial No. 628,592, now Patent No. 2,441,582, filed November 14, 1945. It is the intention not to claim the detail of this form here. This later form of shovel is front emptying; may be emptied at any point along its travel; and may be positioned at the same point for a new cycle without going back to the retracted position to release the latch holding the shovel up in loaded position. It tilts about an axis within the body of the shovel, as distinguished from tilting about an axis outside of the shovel and has a different form of latch which, for some purposes, has special advantages.

The runners are differently placed and are in the form of what might be described rather as shoes than as runners. The shoes 243 are shown in Fig. 18 only. For some uses, neither runners nor shoes will be needed and both have been omitted from the remainder of the figures.

The shovel of the later figures has much greater capacity than that of the best forms of the shovels earlier illustrated. The later form of shovel uses torsional springs.

Because the shovel discharges from the front and it is desirable not to tilt it reversely to an excessive extent, the front wall 200 slopes downwardly and inwardly to a considerable extent, as shown in Figure 18.

Since the positions of the shovel correspond to different extents of projection of the check rod 110' at the rear end 201 in the tilting assembly and because the check rod is accessible at this point, advantage is taken of the opportunity to latch the shovel in rested position by latching the position of the check rod at its rear and exposure. This is shown in Figures 19, 19$^{a}$, 22 and 26 and will be described later.

However, with this character of latch and a front emptying shovel, the shovel not only can be emptied at any point in the length of its travel but can be swung to its initial counterclockwise position, as compared with Figure 18, ready to start a new cycle. In connection with the latching construction of the check rod in Figure 26, the shovel furthermore is capable of latching with partial filling movement only of the shovel because of the presence of torsional springs 202, also to be described at a later point.

With the use of the torsional springs and the latching mechanism engaging a ratchet latching keeper, it will be possible to completely empty the shovel whether the shovel be initially fully filled or but partly filled, so that a new cycle may be started at any point of retraction at which it is desired to empty the shovel.

The later illustrated shovels have the same form of tilting of the shovel by progressive driving movement of the plunger as the earlier forms but differ in the location of the tilting axis by reentrantly contouring the rear of the shovel. In the central part of its length a recess 204 (Figure 23) is provided between wall 205. At opposite ends of the shovel, in line with the recesses, pockets 206 are located, not only giving additional capacity for material loaded but also placing part of the coal in these pockets in position to partially counterbalance the coal in the upper front of the shovel.

Within the recess and between the pockets, I locate the segment 116' effective as a gear and because of the difficulty in mounting it upon a pin, I pass a shaft 208 through the length of the shovel as a support for the gear. The gear engages a rack upon check rod 110', which check rod may be stopped by a check finger. Though the check rod construction and the selector bars are different in the form shown in Figure 18, the operation is the same, namely that the check finger or the selector bars may be turned one with respect to the other about the check rod axis so that selectively the check fingers may find any preferred check rod within their path of movement or the check rod may be so located as not to meet any of the selector bars and therefore as not to stop movement of the rack and not to cause revolution of the shovel.

The last use, freeing the check finger from selector bar engagement, will be used for special purposes where bulldozing or raking is intended and a special tool is used, or where a shovel, if used, is not intended to be revolved.

In the form shown in Figures 18 and 19, the check rod 110′, in order to secure additional strength, is made up of a composite rod comprising an outer tubing 209 within which operates a longitudinally extending, re-enforcing rod 210. The finger 118′ in this form is a bar 211 which is fastened in the re-enforcing rod and extends transversely through openings in the tube so that the edges of the bar are longitudinally supported by the walls of these openings.

The check finger, however, operates in precisely the same manner as does the check finger 118 in the other views.

The check rod of Figures 18 and 19 is intended to cooperate with a shoulder sleeve 212 which surrounds the check rod and which is cut away so as to provide progressively at different lengths along the check rod, shoulders 213, 213′, $213^2$, etc., against which the check finger is adapted to engage selectively according to the length of travel of the check rod intended, before the shovel reaches the position at which it is to be loaded.

Since the selector bar sleeve may be mounted about the tubing of the composite check rod, it can be turned freely about this tubing to present different shoulders within the path of movement of the check finger 118′, which check finger, therefore, need not be rotated. Furthermore, the selector bar sleeve can be turned to a point at which the check finger will not engage any shoulder, permitting travel of the check rod along slot 214 without stoppage and therefore without any relative lengthwise movement between the rack and the gear. The slot 214 may be cut all the way through or be cut far enough through only so that there will be no stoppage of movement of the check finger 118′. If the slot be cut all the way through, the tubing may be selected of such size as to tend to spring shut about the intermediate tubing between it and the interior rod, so as to permit the shouldered, outer tube to be retained in adjusted positions by the friction upon the intermediate tube even if the slot 214 be not cut clear through. Advantage is taken of circumferential spring of a cut tube the size of the outer tube carrying the shoulders which may be such that it will just hug the intermediate tube with sufficient friction so as to permit longitudinal movement of the check rod through it to cause engagement of the check finger with the shoulders while having enough friction to prevent circumferential movement between the outer and the intermediate tubes. The shouldered selector tube may be rotated by handle 215 to secure new positions.

The third form of selector bar and check finger construction appears in Figure 26 where the check finger 216 is capable of being adjusted circumferentially so as to cooperate in its longitudinal movement with either selector bars of the type shown in the earlier figures or with selector shoulders of a type shown in Figure 18, but in either event with the selector bars or shoulders anchored against circumferential movement that is rigidly fixed to some suitable support. The form in Figure 26 has the great advantage that it can be supplied with a latch-like indicator which will show the position of the particular bar or shoulder, with which the selector finger is intended to cooperate. Because this adjustment to different selector bar positions must be made in a narrow space under cramped conditions, it is a great advantage to have the adjustment capable of being made at the extreme rear of the thrustor and to have the advantage of an indicator at this extreme end by which the position of the check finger with respect to the bars or shoulders can be determined accurately.

A further advantage in the form of Figure 26 lies in the fact that if the mechanism is capable of being set by means located wholly at the rear of the thrustor, a large part of the remainder of the mechanism can be protected by a covering 217 with considerable advantage in protection of the mechanism.

In Figure 26 the check rod $110^2$ may be tubular but unaltered in contour from the rack back to a point close to the position of the check finger at which point all of the mechanism can be located. The intention is to provide a check finger 216 which can be adjusted circumferentially and whose adjustment can be indicated at the rear of the mechanism where the adjusting means is also located.

In the construction shown, the tubular check rod end is threaded at 218 to receive a threaded stub 219 which should preferably screw into the thread of the tube tightly enough to remain in adjusted position. The stub 219 is rigid with a check finger body 220 which carries the check finger 216.

If the stub 219, therefore, be screwed in or out of the thread in the main part of the tube, the angular position of the check finger will be changed correspondingly. It is necessary only, therefore, to provide means by which the body 220 may be turned to screw the stub 219 rigidly attached to it inwardly or outwardly to obtain the intended angular adjustment.

In the form shown, the body 220 is provided with a threaded stub 221 on the opposite side of the body from stub 219. This threaded stub 221, rigid with the body, is extended at 222 in order to carry a lever arm 223 which is held in place upon it as shown by a set screw 224. The threaded stub 221 and the extension in the form of shaft 222 is surrounded by a sleeve 225 which performs two functions. It is threaded upon the stub 221 to support rear ratchet recesses 226, within which will fit a spring detent 227 carried by the adjusting handle 228, and the detent face desirably carries any type of dial by which the angular position may be determined from the end.

A further function of the sleeve 225 is that it is notched at 229 for engagement by a latch 230—not shown in Figure 26 but seen in Figure 22—if latching of the full stroke only of the shovel is to be provided. On the other hand, if it be intended to latch the shovel in whatever partly rotated position it may assume, this may be provided by ratcheted notches 231 (Figure 26), into any one of which the latch 230 may fit, the movement of the selector rod pushing the ratchet faces past the latch so that the latch will engage with that ratchet face farthest from the handle 228 reached by the rod as a result of the turning movement of the shovel and the reactive position of the gear in this position of the shovel upon the rack and therefore upon the check rod connected with the rack. In this way, as the shovel turns in clockwise direction, as viewed in Figure 18, the latch will be pushed out successively by the different ratchet faces shown from ratchet face 232 to ratchet face 233; and the latch will rest in and hold at any of the intermediate locking faces 234.

One form of latch capable of use either with the single notch at 229 or with the ratcheted notches at 231 is shown in Figures 19ª and 22. In this figure, the actual latch which engages in the notch or notches is located at one end of the lever 235, and is pivoted at 236. It is spring pressed into engagement with the notch normally by a spring 237 and is released from this notch when the current is on the solenoid by link 238 which is the right hand link in Figure 19ª. When the solenoid is energized, its armature 239 is drawn inwardly in the figure with the result that lever 240 (Figure 19ª) is turned about its pivot 241 so as to pull the lever 238 upwardly in the direction of the arrow. The lever 238 is pivotally connected at 242 with the latch 230 so that as the link 238 is pulled upwardly in Figures 19ª and 22, the latch is released from the notch in which it may be engaged and is held in released position as long as current is continued through the solenoidal winding.

During the forward movement of the thrustor, the points 245 travel along the floor of the chamber and the front surface 200 lies substantially perpendicular to the floor of the chamber as seen in dotted lines in Figure 18.

During the retractive movement of the shovel when the shovel is in the position seen in Figure 18, the weight of the shovel rests upon the surface 247 of the shoes as it is pulled back by retraction of the thrustor. During this movement, the shovel is latched in the position seen in Figures 18 and 19 by the latch described above, located at the rear of the check rod and will come back to any desired distance, clear back to the innermost position of the thrustor unless the latch at the rear of the check rod be released earlier.

While the emptying of the shovel normally takes place after at least partial retractive movement of the shovel, occasion arises also, of course, where the shovel is but partially filled, and where it is desired to empty the content back on the pile. Sometimes it will be desirable to discharge the content when the retractive movement is not great enough for the thrustor to tilt.

The latch holding the shovel in its partially or fully lifted position must be released before emptying or as part of the emptying operation.

The shovel cannot be satisfactorily emptied after it has been filled or partly filled unless the shovel end of the thrustor be tilted high enough to permit the shovel to fall back to a position where the coal will slide out over the front of the shovel which now, by reason of its position, becomes the bottom of the shovel. For this reason, unless the thrustor has retracted to a point where it tilts by gravity, a jack or other tilting means must be used, of which one form is shown in Figure 2ª.

In normal use, the emptying of the shovel will take place after the more or less complete retraction of the thrustor, and after the thrustor tilts upwardly at the shovel end. Releasing of the latch in this case permits the shovel to swing as a pendulum back beyond the point at which it would ultimately hang, and subsequently forward, repeating, until it stops. It thus moves farther back than would be necessary for the content to slide down the front wall and discharge. As later more fully explained, this pendulum action is assisted by torque springs.

In the position shown in Figure 18 it is not the intention that the points 245 must actually engage the floor of the chamber. Instead, they are preferably slightly lifted so as to ride above the floor, thus riding over irregularities in the floor.

This lifting of the points does not interfere with the shovel properly digging under and into the pile of material to be gathered.

It is desirable to keep the tilting assembly nearly horizontal for the reason that the long end with respect to the tilting axis, whether it be the end at the rear or the shovel at the front, must be limited in its movement to avoid striking the roof or the floor.

In Figure 18, the shovel shoes protect against excessive elevation of the rear of the tilting assembly. The tilting must evidently be controlled in both directions.

I have already described the locking of the tilting assembly in its position in which the shovel is lifted on retraction, requiring that in projected discharge position the shovel be lifted far enough from the floor for there to be room for discharge of the content. This is true whether the shovel empty through the rear (at that time lower gate) or through the front of the shovel.

With either form, if the runners or shoes be omitted the shovel must be held in elevated position during retraction.

With the second form of shovel, in the absence of shoes (Figures 23, 24, 25) the swinging of the shovel forwardly and upwardly, as in Figure 18, would mean that the bottom of the shovel touches the floor of the chamber unless the tilting assembly turns in counterclockwise direction about its axis.

If the shoes be not used, it is desirable to maintain the shovel in the lifted position of Figure 18 during its entire retractive stroke in order that the shovel may not engage the floor, which would interfere with the horizontal swinging movement of the shovel to a new horizontal angular position along which the shovel is to be projected to the point of discharge. In this structure, as in the earlier structures described, the tilting assembly on retraction will tilt automatically to lift the shovel somewhat from the floor as soon as the center of gravity of the assembly passes the tilting axis.

In Figure 17, blocks 251 are inserted between the turntable and the bearings through which the supporting and guiding rods slide forwardly and rearwardly. These blocks support the front of the tilting assembly so that, independently of the lock for the tilting mechanism, the shovel is maintained at a desired height. This height is selected as a height at which the tilting assembly will be approximately horizontal.

It has been found that when the blocks are used the shovel points—or the front of the shovel close to the points—should just rest upon the floor of the chamber with the assembly tilted forwardly and downwardly. The blocks used are regarded as "pinch" blocks because in action they are pinched between the tilting crosshead and the turntable.

The shovels shown in Figures 18, 19, 23, 24 and 25 can have considerably greater capacity than those shown in the earlier figures because the swinging of these shovels of Figures 18, 19, 23, 24 and 25 about an axis passing through part of the content makes it possible to gather the content into the shovels with much less lifting effort than if the entire content be outside the axis.

Advantage is taken of this opportunity to enlarge the shovels by providing lobes, pockets or booths 252, 253, in the rear of the face 254 of the reentrant wall 255. These lobes comprise inner end reentrant walls 256, 257, bottom reentrant walls 258, and the outer end walls 259, 260 of the shovel.

The supporting shaft passes through end walls 256, 257, 259 and 260, and is supported in bearings 261, 262, welded to the walls 256, 257 in the illustration.

It will be evident that the fact that the shovel content is tilted about an axis through the body of the shovel greatly reduces the tilting effort required and permits the use of a shovel of greatly increased capacity, even though the capacity of the front part of the center of the shovel is reduced by the reentrant walls which permit the gear to be inset as shown.

The slip bearing 263 in Figure 23 is fastened by plates 264 to the top of side plates 265 whose lower portions are reinforced by collars 266 held to the shaft 208 by set screws 268. The shaft is thus kept from rotation.

The shaft is extended through as seen at the left hand end of the figure at 269. Spiral springs 202' surround two ends of the shaft and are used as torsional springs in order that the springs may be wound (tightened) during filling upward movement of the shovel, to latching position so that the springs may be used to assist in the unloading reverse swinging movement of the shovel when the latch at the back of the check rod shall have been released.

The shovel revolves about the shaft and is reenforced suitably at 271 and 272 by collars welded to the adjacent walls of the shovel. Since the shaft is fixed against rotation, the preferably oppositely wound springs 202' are connected at one end each to the shovel at 273 and at the opposite end each to the shaft at 274. The purpose is that the springs, with whatever initial torsion may be desirable to support part of the weight of the shovel, shall be wound during and by the upward movement of the shovel, be held by a latch such as that at the end of the check rod, and shall start the shovel on its swinging downward movement toward discharge when the latch is released.

The strength and character of spring will depend upon the motion expected of it. It may be selected so as to give a quick impulse to start the downward movement but be unwound before the proper discharge position is reached so as to tend to support the shovel against movement beyond proper discharge position, or it may resiliently assist in revolution of the shovel in the direction for discharge to a distance of revolution beyond normal discharge. In either event, at the time released, the shovel must be high enough above the surface upon which there is to be discharge to permit the intended extent of swinging movement.

Either end of the spring obviously can be connected with the shovel and the other end with the shaft. In the illustration, the outer ends 275 of the springs are passed through slots 276 and the inner ends 277 of the springs are looped at 278 for engagement with pins 279 within the shaft.

Any suitable stop mechanism may be used to limit the extent of movement of the segment gear along the rack and the stoppage is not limited to Geneva gear stoppage of tooth engagement as at 280 between the rack and gear nor engagement beteen the shovel 281 and fixed surfaces 282.

The movement of the segment gear bodily along the length of the rack to produce rotary motion of the gear and revolution of the shovel translates this bodily gear movement from reciprocating to rotary gear movement. The translation could be illustrated by other reciprocating-to-rotary examples of which one other only is shown.

In Figures 27, 28 and 29, a rod 285 connected with the check rod is swivelled to a crank arm 286 through a slot and pin at 287. The slot 288 may occur in either part but is shown in the arm and the pin 289 is mounted upon the rod. The crank arm is swung about an axis 290 to shift the other crank arm—here in effect the shovel 291—through the required extent of angular movement.

Having thus described my invention, what I claim as new and desire to secure by Letters Patent is:

1. In a mining loader, a thrustor, a crosshead carried by the thrustor, a gear rotatably supported in the crosshead, a shovel rigid with the gear, a check rod, a guide for the check rod, a rack engaging with the gear and carried by the end of the check rod, adjustable stop means for limiting the movement of the check rod, means for projecting the thrustor, crosshead and shovel forward until the check rod is stopped and for further advancing the thrustor, crosshead and shovel as the shovel is raised by turning the gear on the rack, and means for retracting the thrustor, crosshead and shovel.

2. In a mining loader, a thrustor, a crosshead carried by the thrustor, a gear rotatably supported in the crosshead, a shovel rigid with the gear, a check rod, a guide for the check rod, a rack engaging with the gear and carried by the end of the check rod, a stop for the movement of the check rod, a latch for holding the shovel in upwardly tilted position, means for projecting the thrustor, crosshead and shovel forward until the check rod is stopped and for further advancing the thrustor, cross head and shovel as the shovel is raised by turning the gear on the rack, and means for retracting the thrustor, crosshead and shovel.

3. In a mining loader, a thrustor, a crosshead carried by the thrustor, a gear rotatably supported in the crosshead, a shovel rigid with the gear, a check rod, a guide for the check rod, a rack engaging with the gear and carried by the end of the check rod, a stop for the movement of the check rod, a stop for limiting tilting movement of the shovel, means for projecting the thrustor, crosshead and shovel forward until the check rod is stopped and for further advancing the thrustor, crosshead and shovel as the shovel is raised by turning the gear on the rack, and means for retracting the thrustor, crosshead and shovel.

4. In a mining loader, a thrustor, a crosshead carried by the thrustor, a gear rotatably supported in the crosshead, a shovel rigid with the gear, a check rod, a guide for the check rod, a rack engaging with the gear and carried by the end of the check rod, a stop for movement of the check rod, a stop for limiting tilting movement, a latch for holding the shovel in its tilted position, means for projecting the thrustor, crosshead and shovel forward until the check rod is stopped and for further advancing the thrustor, crosshead and shovel as the shovel is raised by turning the gear on the rack, and means for retracting the thrustor, crosshead and shovel.

5. In a mining loader, a thrustor, a crosshead carried by the thrustor, a gear rotatably supported in the crosshead, a shovel rigid with the gear, a check rod movable generally with the thrustor, a guide for the check rod, a rack engaging with the gear and carried by the end of the check rod, a stop for movement of the check rod, a latch for holding the shovel in tilted position and means engaged by the latch in retractive movement of the thrustor by which the latch is released.

6. In a mining loader, a thrustor, a crosshead carried by the thrustor, a gear rotatably supported in the crosshead, a shovel rigid with the gear, a check rod, a guide for the check rod, a rack engaging with the gear and carried by the end of the check rod, a stop for movement of the check rod, a latch for holding the shovel in tilted position, an electromagnetic release mechanism for tripping the latch, means for projecting the thrustor, crosshead and shovel forward until the check rod is stopped and for further advancing the thrustor, crosshead and shovel as the shovel is raised by turning the gear on the rack, and means for retracting the thrustor, crosshead and shovel.

7. A thrustor, a crosshead with which the thrustor is connected, a gear rotatably mounted upon the crosshead, a shovel revoluble with rotation of the gear, a rack movable with respect to the crosshead and engaging the gear, a check rod connected with the rack, finger and stop means, the latter being within the path of movement of the former, for holding the check rod and rack at a predetermined point, said thrustor adapted to move the crosshead and carry the rack while the check rod is free to move and adapted to continue to move after the movement of the rack has stopped, and means for limiting the extent of movement of the gear along the rack.

8. A thrustor, a crosshead carried by the thrustor, a shovel, rack and gear means supported by the crosshead for revolving the shovel when forward movement of the crosshead and gear occurs with respect to the rack, stop connections with the rack permitting normal movement of the rack with the gear and effective to hold the rack while the gear turns on the rack when the stop is applied and means for moving the shovel, gear, crosshead and thrustor forward, and for retracting the same.

9. In a shovel for a loader, a tilting assembly, a shovel, hydraulic means for projecting the assembly, a rack, means for moving the rack forwardly with the shovel, a gear engaging the rack and rigid with the shovel, means for stopping the rack at a predetermined point, and means for revolving the shovel upward operative with further forward travel of the shovel when the rack has stopped.

10. A shovel assembly including a cylinder and plunger and supporting and guiding bars therefor, means for controlling the distance to which the shovel is driven forward including a check rod, selector bars and a check arm, and rack and pinion means for concurrently advancing the shovel forwardly and turning the shovel upwardly at the end of the shovel stroke.

11. In a loader, a crosshead, a pivot pin carried by the crosshead, a segment pivoted about the pin, a shovel secured to the segment to turn with it, a rack, means for moving the rack, and means for turning the shovel and raising it about the face of the rack as a fulcrum and concurrently advancing it through space along the length of the rack to deliver a blow to the material being loaded.

12. In a loader, a vertical tilting crosshead assembly, a cylinder and plunger carried thereby, means for providing hydraulic pressure for the cylinder, a shovel projected by the plunger, a rotatable segment rigid with the shovel and adapted to travel along the length of the rack when the rack is stationary, a rack above the segment with which the segment engages, and means for controlling the forward position of the rack with respect to an initial position of the segment, whereby when the rack is stationary the crosshead, shovel and segment continue to move forward, apply impact to the pile and raise the shovel.

13. In a loader, a revoluble shovel, a crosshead support for the shovel, runners beneath the shovel and rigid with it having a greater distance from the pivotal support when the shovel is in gathering position than when it is in loaded position, a rotatable segment gear rigidly connected with the shovel, a support for the segment, a rack with which the segment engages, means for controlling the position of the rack, and hydraulic plunger means for driving the shovel, segmental gear and crosshead forward after the rack has ceased to move, whereby the shovel is revolved to gather and the distance of the runners from the pivotal support is reduced as the shovel revolves through the pile to be gathered.

14. In a loader, a guided assembly comprising a plunger, side supporting rods movable with the plunger, a check rod movable generally with the plunger, selector bars controlling the stopping point of the check rod, whereby the check rod stops before the plunger completes its movement a rack movable with the check rod, a segment gear pin driven through space by the plunger, a segment gear mounted upon the pin and engaging the rack, a shovel revoluble about the gear pin with rotation of the segment gear, and means for operating the plunger.

15. In a coal loader, a support, a turntable mounted upon the support, means for rotating the turntable, a plunger cylinder carried by the turntable, a plunger for the cylinder, a crosshead at the end of the plunger, hydraulic pressure means for driving the plunger and for retracting it, a segment gear pivotally mounted at the front end of and driven by the plunger, a shovel revoluble with the segment gear, a rack above the segment gear driven in part by the plunger and movable generally with the plunger, with which rack the segment gear engages to rotate the segment gear and revolve the shovel upon movement of the gear along the rack, and selector means for determining the extent of movement of the rack, whereby when the rack is restrained continued forward movement of the plunger will raise the shovel.

16. In a loader, a crosshead assembly, a rotatable turntable on which the assembly is mounted, an hydraulic cylinder and plunger carried by the assembly, a shovel, means for guiding the shovel, supports for the shovel movable with the plunger, bearings for the supports, a segment gear connected to turn in vertical planes with the shovel, a rack engaged by the segment gear, a check rod for the rack supporting the rack, permitting longitudinal movement of the rack, a check arm and selector bars by which selectively the check rod is stopped at any one of a plurality of predetermined positions but the plunger can move after the check rod has stopped.

17. In a loader for coal, a horizontally rotatable and vertically tiltable gathering assembly, comprising a shovel, a support for the shovel providing plunger forward movement for the shovel and retraction therefor, a rack mounted upon and movable with the forward end of the assembly, a segment gear engaging with the rack and movable forward along the rack after the rack has stopped, to tilt the shovel upward, and means for selectively stopping the rack, controlling the point at which the rack stops its forward movement, whereby after the rack is stopped the energy of motion of the forwardly moving shovel and supporting parts is delivered to the pile.

18. In a coal loader, a base, a turntable upon the base, means for mounting and rotating the turntable over the base, a vertically swinging crosshead, a shovel, plunger means mounted upon the crosshead, segment gear and rack means for advancing the shovel bodily and revolving the shovel upwardly at the end of its stroke, mounting and guiding means for the rack holding it to straight line movement, and selector bar means for stopping the movement of the rack, adjustable to determine the point at which the shovel begins to revolve.

19. In a loader, a shovel having forward shovel teeth and runners extending from the teeth rearwardly in curved form, a shaft support for the shovel nearer to the runners at the teeth than to the runners at the rear of the shovel, hydraulic driving means including a cylinder and a plunger having the shovel mounted at its front end for pushing the shovel forwardly, rack and gear segment turning mechanism for turning the shovel out through the pile to be loaded, the rack being stationary and the gear travelling along the rack when the shovel is being raised, and a tilting mount for the loader.

20. In a loader, a base, a horizontal bearing upon the base, a turntable thereon, a tiltable gathering and loading unit mounted on the turntable including a shovel carried by the gathering and loading unit, a plunger carried by the unit, means for giving the unit a forward stroke, means including a gear which moves forward with the shovel and a rack which is stationary when the gear moves forward for revolving the shovel upwardly at the end of the stroke, a latch for holding the unit in its new position, means for retracting the plunger and hydraulic means for tilting the assembly upwardly to lift the shovel bodily.

21. In a loader, plunger and guide rods connected to move forwardly and rearwardly together, a check rod having a rack and moved by means of the rack, normally with the plunger and guide rods, stops for the check rod engaged by the check rod in certain angular relations of the check rod with respect to the stops and free from engagement in a different angular relation, a head movable forwardly and rearwardly with the plunger, a shovel supported from the head, a segment gear rigid with the shovel and engaging with the rack to turn the shovel in vertical planes when the stops are effective and means for adjusting the angular relations of the check rod with respect to the stops.

22. In a loader, a thrustor, a crosshead operated by the thrustor, a check rod, supports for the check rod permitting longitudinal movement in connection with the crosshead, a finger carried by the check rod, stops having different lengths and located about the check rod, the finger and stops being relatively adjustable so that the path of movement of the finger may be made to engage with any stop, a shovel carried by the crosshead and connections between the end of the check rod and the shovel, whereby when the check rod has been stopped further movement of the crosshead turns the shovel.

23. In a loader, a shovel, a pivot for the shovel, a crosshead supporting the pivot, a thrustor supporting the crosshead at one end and movable back and forth between limiting positions, a horizontal pivot for the thrustor located intermediate its ends, whereby with the thrustor projected forward the preponderant weight is forward and with the thrustor retracted rearward the preponderant weight is rearward, means including gearing for raising and lowering the shovel and mechanism releasing the thrustor to teeter about its horizontal pivot as the thrustor is moved in one direction, whereby the downward teeter of the shovel in forward movement brings the shovel close to the floor and the upward teeter of the shovel in retraction gives additional height for unloading of the shovel.

24. In a loader, a shovel, a horizontal pivot for the shovel, a crosshead supporting the pivot, a thrustor supporting the crosshead at one end and movable back and forth between limiting positions, a gear on the shovel, a rack cooperating with the gear and guided by the crosshead, a check rod connected to the rack, mechanism for locking and releasing the check rod, a horizontal pivot for the thrustor located intermediate its ends, whereby with the thrustor projected forward the preponderant weight is forward and with the thrustor retracted rearward the preponderant weight is rearward, and mechanism for releasing the thrustor so that the shovel can teeter downward about its horizontal pivot as the thrustor is moved forward, whereby with retraction of the shovel the teeter raises the shovel and gives additional height for unloading.

25. In a loader, a shovel, a thrustor supporting the shovel, a horizontal pivot for the shovel, located intermediate the ends of the thrustor, whereby the combination of the thrustor and shovel when projected forward has its preponderant weight forward and when projected rearward has its preponderant weight rearward, and a quick release lock controlling teetering of the thrustor and shovel about its horizontal pivot, so that the teetering action of the thrustor and shovel is under control of the operator.

26. In a loader, a shovel having a shovel edge, a gear rigidly connected to the shovel and behind the shovel edge, a horizontal pivotal mounting for the gear, a rack above the gear and having the rack teeth downwardly directed against the gear, guiding surfaces for the rack connected to the horizontal pivot mounting for the gear, means for advancing the rack with the gear and for stopping the rack with respect to the gear, and means for advancing the gear and shovel with the rack, for continuing the advance of the gear and shovel when the rack is stopped and thereby swinging the shovel up about its pivot and for retracting the gear and shovel.

27. In a loader, a shovel, a gear rigidly connected to the shovel, a head providing horizontal pivotal mounting for the gear, a rack above the gear, and having its gear teeth downwardly directed and constantly meshing with the gear, an adjustable stop for limiting the forward motion of the rack and means for advancing the gear and shovel with the rack to a point at which the shovel engages the pile of material to be gathered and loaded and the rack is stopped, for continuing the advance of the gear and shovel while the rack is stopped and thereby swinging the shovel up about its pivot and up through the pile and for retracting the gear and shovel.

28. In a loader, a pivotal support on a vertical axis, a pivotal support on a horizontal axis mounted on the pivotal support on the vertical axis and having swinging movement thereabout, a boom mounted on the pivotal support on the horizontal axis and having its weight distributed on either side of the horizontal pivotal axis so that with movement bodily the preponderance of weight will shift from one side to the other of the axis and the boom will teeter about the horizontal pivotal axis, a shovel mounted on one end of the boom, means for extending and retracting the boom and shovel to shift the preponderance of weight to opposite sides of the horizontal axis, and locking mechanism for locking the boom and shovel against teetering downward at the shovel end as the shovel is moved forward and for releasing the shovel to permit it to teeter downward and contact the floor when the preponderance of weight is at the shovel end, the teetering motion being produced wholly by the change in preponderance of weight without application of lifting force.

29. In a loader, a horizontal axis pivotal mounting, a thrustor mounted on the pivotal mounting and having the preponderance of weight disposed oppositely with respect to the pivotal mounting at the two limits of motion of the thrustor so that the thrustor will teeter about the pivotal mounting under its own weight and that of the load, a second horizontal pivotal mounting at one end of the thrustor, a gear pivoted in the second horizontal pivotal mounting, a shovel rigidly connected to the gear, a rack intermeshing with the gear and a stop for limiting the position of the rack, whereby with forward motion of the gear when the rack is stopped the shovel will continue to move forward and raise upward in the material to be loaded and on retraction of the shovel will first travel on the material to be loaded and will then raise as the thrustor teeters to clear the floor due to shift of the preponderant weight to the opposite side of the horizontal pivot on which the thrustor teeters.

30. In a loader, a shovel and gear attached to the shovel, and a rack meshing with the gear, means for driving the rack, shovel and gear forward together to a point at which the shovel is intended to load, and means for stopping the forward movement of the rack at that point while continuing to drive the gear and shovel forward and raising the shovel through the pile by the forward movement of the gear on the rack.

31. In a loader, a shovel having runners progressively reducing in height from the front of the runners along the bottom of the shovel to the rear of the runners at the bottom of the shovel, means for driving the shovel forward while raising it on the front of the runners and means for turning the shovel upwardly through the material to be gathered while transferring the weight of the shovel and load to the rear of the runners, whereby the height of the material gathered from the surface on which it rests is lowered during the gathering operation.

32. In a loader, a shovel having a shovel edge, a gear rigidly connected to the shovel and behind the shovel edge, a horizontal pivotal mounting for the gear, a rack above the gear and having the rack teeth downwardly directed against the gear, guiding surfaces for the rack connected to the horizontal pivot mounting for the gear, means for advancing the rack with the gear and for stopping the rack with respect to the gear, means for advancing the gear and shovel with the rack, for continuing the advance of the gear and shovel when the rack is stopped and thereby swinging the shovel up about its pivot and for retracting the gear and shovel and horizontal pivot means supporting the loader with weight on both sides of the pivot means in position such that the preponderance of the weight shifts during retraction of the loaded shovel and the shovel is free to rise during retraction due to teetering about the horizontal pivot means.

33. In a loader, a cylinder, a plunger in the cylinder, means for supplying hydraulic pressure to the cylinder, a shovel driven by and supported on the plunger, runner support for the shovel bringing the shovel lower when the shovel is in filled position than when the shovel is in gathering position, means for swinging the shovel from gathering position to filled position, and a horizontal pivot for the cylinder permitting the loader to teeter about the pivot when the plunger moves from one limiting position to the opposite limiting position.

34. A thrustor, horizontal pivotal mounting for the thrustor permitting the thrustor to teeter about the pivotal mounting as the preponderance of weight shifts from one side to the other of the thrustor, a shovel mounted on the thrustor, runners for the shovel varying in radius between a maximum in the gathering position and a minimum in the fully loaded position, and means for shifting the shovel between the gathering and the fully loaded position, whereby the shovel can move forward in gathering occupying a relatively great vertical height, when loaded will reduce its vertical height, and on retraction will teeter upward to give additional height for unloading.

35. In a loader, a rack, a shovel, a gear meshing with the rack and connected with the shovel to effect upward movement of the shovel, means for projecting the rack and shovel forward with the shovel in forwardly open position to the place of intended filling of the shovel, means for stopping movement of the rack, means for projecting the shovel and the gear in mesh with the rack forward after the rack stops to produce in the shovel a composite movement due to concurrent projection in space and revolution because of the movement of the gear along the rack, whereby the shovel is turned into upwardly open position and means for retracting the filled shovel while maintaining it in upwardly open position.

36. In a loader, a shovel having a relatively great height in its forwardly open position and a relatively less height in its upwardly open position, a rack, a gear meshing with the rack and revoluble with the shovel, means for forwardly projecting the rack and gear together until the shovel comes to the pile while holding the shovel in the forwardly open position of relatively great vertical height, means for holding the rack in fixed position when the pile is encountered and means for further forwardly projecting the shovel and the rack, thereby bodily moving the shovel forward, tuning the shovel toward the upwardly open position, and concurrently with movement of the shovel through the pile, raising the lower part of the shovel upon the balance of the material to be loaded and progressively lowering the material already loaded in the shovel as the shovel moves to the upwardly open position.

37. In a loader, a thrustor mounting having a generally horizontal sliding forward check rod bearing and a generally horizontal sliding thrustor bearing, a generally horizontal thrustor cylinder extending forwardly below the forward check rod bearing and supported on the mounting, a thrustor having a piston rod operating in the thrustor cylinder, having a support rod generally parallel thereto extending through the thrustor bearing and having a generally horizontal sliding rear check rod bearing in line with and behind the forward check rod bearing, a shovel generally horizontally pivotally mounted on the forward end of the thrustor, a gear connected to and turning with the shovel, a rack downwardly directed and meshing with the gear, a check rod connected to the rack and extending through the forward and rear check rod bearings, and a stop for limiting forward motion of the check rod while the thrustor is still moving forward, whereby the thrustor and the check rod mutually telescope at the rear check rod sliding bearing.

38. A check rod for a loader, ratchet faces extending along the length of the rod, a latch resiliently pressed into said ratchet faces and adapted to latch the rod and to permit longitudinal movement in one direction with continued latching, a loader tool, connections between the loader tool and the rod and a thrustor for projecting forward the check rod and loader tool together until the latch locks, whereby the position of the rod when latched holds the loader tool in position.

39. A loader tool, a shaft about which the tool turns, a check rod, connections between the end of the check rod and the tool, relating swinging movement of the tool to longitudinal movement of the check rod, a thrustor for projecting the check rod, tool and shaft forward and retracting the same together, a lost motion connection between the check rod and the thrustor, stops for the check rod and a ratchet and latch connection holding the tool in position by the portion of the check rod at which the latching takes place.

40. A check rod for a loader, ratchet faces extending along the length of the rod, a latch resiliently pressed into said ratchet faces at the rear of the check rod and adapted to latch the rod and to permit longitudinal movement in one direction with continued latching, a solenoid controlling latching engagement, a loader tool, connections between the loader tool and the check rod, and a thrustor for projecting forward the check rod and loader tool together until the latch fastens, whereby the position of the rod when latched holds the loader tool in position.

41. A check rod for a loader, ratchet faces extending along the length of the rod adjacent the rear end, a latch resiliently pressed into said ratchet faces at the rear end and adapted to latch the rod and permit longitudinal movement in one direction with continued latching, a solenoid controlling the latch operation, a loader tool, connections between the loader tool and the check rod, a thrustor for projecting forward the check rod and loader tool together, means for checking the check rod, and lost motion connection between the thrustor and the check rod for permitting the thrustor to continue forward movement after the check rod is checked, whereby the position of the check rod where checked determines the loader tool position.

42. A material gathering means comprising a container movable from empty to filled position, a reciprocating power shaft upon which the container is pivoted, a second normally unrestrained shaft, a reciprocating-rotary connection between the container and the second shaft operative upon forward movement of the reciprocating shaft to move the unrestrained second shaft therewith, means operative upon forward movement of the power shaft for restraining forward movement of the unrestrained shaft to render the reciprocating rotary connection operative to pivot the container to filled position, and latching means operative upon movement of the container to restrain independent movement of the second shaft upon reverse movement of the power shaft.

43. A material gathering means comprising a container, a container support on which the container is pivotally mounted with the center of gravity of the container forward of the pivot, means for moving said support in reverse directions, a reciprocating rotary connection on the support for pivoting the container, said connection including a sliding member and a rotary member, one of said members being normally unrestrained and the other fixed to the container, the weight of the container causing it to pivot to empty position when said member is unrestrained, means for restraining independent movement of said unrestrained member upon predetermined forward movement of the support to cause the rotary member to turn on the sliding member and pivot the container to filled position, and means operative upon movement of the container to filled position to restrain said member upon reverse movement of the support.

44. A material gathering means comprising a container, a container support on which the container is pivotally mounted with the center of gravity of the container forward of the pivot, means for moving said support in reverse directions, a reciprocating rotary connection on the support for pivoting the container, said connection including a sliding member and a rotary member, one of said members being normally unrestrained and the other fixed to the container, the weight of the container causing it to pivot to empty position when said member is unrestrained, means for restraining said member upon predetermined forward movement of the support to cause the rotary member to turn on the sliding member and pivot the container to filled position, means operative upon movement of the container to filled position to restrain independent movement of said unrestrained member upon reverse movement of the support, and means for releasing said last named means upon predetermined reversed movement of the support.

45. A material gathering means comprising a container, a thrustor movable in reverse directions and on which said container is pivoted, and means for pivoting the container from empty to filled position comprising a sliding member and a rotary member associated with the thrustor and container, one of said members being normally unrestrained whereby the container will normally pivot to empty position, and means operable upon forward movement of the thrustor to restrain said unrestrained member whereby upon continued forward movement the container will be moved to filled position.

46. A material gathering means comprising a container movable from empty to filled position, a reciprocating power shaft upon which the container is pivoted, a second normally unrestrained shaft, a reciprocating-rotary connection between the container and the second shaft operative upon forward movement of the reciprocating shaft to move the unrestrained second shaft therewith, and means operative upon predetermined forward movement of the unrestrained shaft to restrain movement thereof and to render the reciprocating-rotary connection operative to pivot the container to filled position.

47. A material gathering means comprising a container, a container support on which the container is pivotally mounted with the center of gravity of the container forward of the pivot, means for moving said support in reverse directions, a reciprocating-rotary connection on the support for pivoting the container, said connection including a sliding member and a rotary member, one of said members being normally unrestrained and the other fixed to the container, the weight of the container causing it to pivot to empty position when said member is unrestrained, means for restraining said member upon predetermined forward movement of the support to cause the rotary member to turn on the sliding member and pivot the container to filled position.

48. A material gathering means comprising a container, a thrustor movable in reverse directions and on which the container is pivoted, means for pivoting the container comprising a sliding member and a rotary member associated with the thrustor and container, said members moving simultaneously with the thrustor upon forward movement thereof, means operable upon predetermined forward movement of the thrustor to stop movement of one of said members causing the other to move relative thereto and pivot the container, and means operative upon movement of the members to latch said members in their relative positions for simultaneous reverse movement with the thrustor.

49. A material gathering means comprising a power driven translatable shaft, a second translatable shaft, means interconnecting said shafts for simultaneous forward translation comprising a pivoting member pivoted on one shaft and a reciprocating member on the other, said members being operable as a reciprocating-rotary connection upon relative movement of the shafts, means operable upon predetermined forward translation to restrain forward movement of the second shaft whereby the power shaft will move relative thereto, and a container fixed to the pivoting member for movement from empty toward filled position upon relative movement of the shafts.

50. A material gathering means comprising a power driven translatable shaft, a second translatable shaft, means interconnecting said shafts for simultaneous forward translation comprising a pivoting member pivoted on one shaft and a reciprocating member on the other, said members being operable as a reciprocating-rotary connection upon relative movement of the shafts, means operable upon predetermined forward translation to restrain forward movement of the second shaft whereby the power shaft will move relative thereto, and means for latching the shafts in their relative positions for simultaneous reverse translation thereof.

JOHN B. McDADE.

REFERENCES CITED

The following references are of record in the file of this patent:

UNITED STATES PATENTS

| Number | Name | Date |
|---|---|---|
| 105,883 | Bailey | Aug. 2, 1870 |
| 1,526,830 | Byrne | Feb. 17, 1925 |
| 1,551,466 | Butler | Aug. 25, 1925 |
| 1,572,009 | Hansen | Feb. 9, 1926 |
| 1,615,284 | Kennedy | Jan. 25, 1927 |
| 1,622,456 | Liebmann | Mar. 29, 1927 |
| 1,750,316 | Gilman | Mar. 11, 1930 |
| 1,796,889 | Emerick et al. | Mar. 17, 1931 |
| 1,861,194 | Sloane | May 31, 1932 |
| 1,987,982 | Wheeler | Jan. 15, 1935 |
| 2,041,734 | Wilcox | May 26, 1936 |
| 2,075,541 | Preston | Mar. 30, 1937 |
| 2,272,337 | Dines | Feb. 10, 1942 |
| 2,301,241 | Biedess | Nov. 10, 1942 |

FOREIGN PATENTS

| Number | Country | Date |
|---|---|---|
| 16,075 (1910) | Great Britain | July 5, 1910 |
| 554,451 | Great Britain | July 5, 1943 |